(12) United States Patent
Chang et al.

(10) Patent No.: US 9,892,866 B2
(45) Date of Patent: Feb. 13, 2018

(54) CARBONACEOUS NANOPARTICLES, METHODS OF MAKING SAME AND USES THEREOF

(71) Applicant: Northwestern University, Evanston, IL (US)

(72) Inventors: Robert P. H. Chang, Glenview, IL (US); Donald B. Buchholz, Woodridge, IL (US); Nam Dong Kim, Houston, TX (US); Byunghong Lee, Glenview, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 56 days.

(21) Appl. No.: 14/671,758

(22) Filed: Mar. 27, 2015

(65) Prior Publication Data
US 2015/0279576 A1    Oct. 1, 2015

Related U.S. Application Data

(60) Provisional application No. 61/970,988, filed on Mar. 27, 2014.

(51) Int. Cl.
| | |
|---|---|
| *H01G 11/04* | (2013.01) |
| *H01G 11/62* | (2013.01) |
| *H01G 11/34* | (2013.01) |
| *H01G 11/36* | (2013.01) |
| *H01G 11/86* | (2013.01) |

(52) U.S. Cl.
CPC ............. *H01G 11/04* (2013.01); *H01G 11/34* (2013.01); *H01G 11/36* (2013.01); *H01G 11/86* (2013.01); *Y02E 60/13* (2013.01); *Y10T 29/417* (2015.01)

(58) Field of Classification Search
CPC ........ H01G 11/04; H01G 11/34; H01G 11/86; H01G 11/36; Y02E 60/13; Y10T 29/417
See application file for complete search history.

(56) References Cited

U.S. PATENT DOCUMENTS

2004/0052289 A1*   3/2004   Chang .................... B01J 19/088
                                                                          373/60

OTHER PUBLICATIONS

Bandow, et al., Interlayer spacing anomaly of single-wall carbon nanohorn aggregate, Chemical Physics Letters 2000; 321: 514-519.*

Bandow et al., "Interlayer spacing anomaly of single-wall carbon nanohorn aggregate," Chem. Phys. Lett. 321:514-519 (2000).

Banerjee et al., "Nanotubular metal-insulator-metal capacitor arrays for energy storage," Nat. Nanotech. 4:292-296 (2009).

(Continued)

*Primary Examiner* — Daniel C McCracken
(74) *Attorney, Agent, or Firm* — Klintworth & Rozenblat IP LLP

(57) ABSTRACT

Methods and compositions of carbonaceous nanoparticle fabrication and their use for electrode materials in supercapacitors are provided. The method includes a first step of reacting a first carbon source with a second carbon source in the presence of a nitrogen source in a DC arc furnace to form a composite nanoparticle. The second carbon source includes a dopant. The composite nanoparticle includes a crystalline carbon phase having an amorphous phase comprising dopant or carbide. The method includes a second step of removing the amorphous second layer to form the carbonaceous nanoparticle.

6 Claims, 26 Drawing Sheets

(56) References Cited

OTHER PUBLICATIONS

Casillas et al., "In situ TEM study of mechanical behaviour of twinned nanoparticles," Nanoscale. 2013, 5:6333 (2012).
Casillas et al., "Direct observation of liquid-like behavior of a single Au grain boundary," Philos. Mag. 2012, 92:4437 (2013).
Doherty et al., "Semi-continuous production of multiwalled carbon nanotubes using magnetic field assisted arc furnace," Carbon 2006, 44:1511 (2006).
Dravid et al., "Buckytubes and Derivatives: Their Growth and Implications for Buckyball Formation," Science 1993, 259:1601 (1993).
El-Kady et al., "Scalable fabrication of high-power graphene micro-supercapacitors for flexible and on-chip energy storage," Nat. Commun. 2013, 4:1475 (2013).
Hammer et al., "Effects of increasing nitrogen concentration on the structure of carbon nitride films deposited by ion beam assisted deposition," J. Vac. Sci. Technol. A 2000, 18:2277 (2000).
Han et al., "Generation of B-Doped Graphene Nanoplatelets Using a Solution Process and Their Supercapacitor Applications," ACS Nano 2013, 7:19 (2012).
Hassan et al., "Pyrrolic-structure enriched nitrogen doped graphene for highly efficient next generation supercapacitors," J. Mater. Chem. A 2013, 1:2904 (2013).
Hsieh et al., "Cathodoluminescence and electron field emission of boron-doped a-C:N films," Carbon 2005, 43:820 (2004).
Inagakia et al., "Carbon materials for electrochemical capacitors," J. Power Sources 2010, 195:7880 (2010).
Iyyamperumal et al., "Vertically Aligned BCN Nanotubes with High Capacitance," ACS Nano 2012, 6:5259 (2012).
Jackson et al., "Determining hybridization differences for amorphous carbon from the XPS C 1s envelope," Appl. Surf. Sci. 1995, 90:195 (1995).
Kang et al., "Incorporate boron and nitrogen into graphene to make BCN hybrid nanosheets with enhanced microwave absorbing properties," Carbon 2013, 61:200 (2013).
László et al., "Effect of activation on the surface chemistry of carbons from polymer precursors," Carbon 2001, 39, 1217 (2001).
Lee et al., "An all carbon counter electrode for dye sensitized solar cells," Energy Environ. Sci. 2012, 5:6941 (2012).
Li et al., "Large scale synthesis of N-doped multi-layered graphene sheets by simple arc-discharge method," Carbon 2010, 48:255 (2010).
Lin et al., "Large scale synthesis of single-shell carbon nanotubes," Appl. Phys. Lett. 1994, 64:181 (1994).
Lin et al., "Controllable graphene N-doping with ammonia plasma," Appl. Phys. Lett. 2010, 96:133110 (2010).
Maldonado et al., "Structure, composition, and chemical reactivity of carbon nanotubes by selective nitrogen doping," Carbon 2006, 44:1429 (2006).
Pech et al., "Ultrahigh-power micrometre-sized supercapacitors based on onion-like carbon," Nat. Nanotech. 2010, 5:651 (2010).
Sheng et al., "Synthesis of boron doped graphene for oxygen reduction reaction in fuel cells," J. Mater. Chem. 2012, 22:390 (2012).
Usachov et al., "Nitrogen-Doped Graphene: Efficient Growth, Structure, and Electronic Properties," NanoLett. 2011, 11:5401 (2011).
Utsumi et al., "Opening Mechanism of Internal Nanoporosity of Single-Wall Carbon Nanohorn," J. Phys. Chem. B 2005, 109:14319 (2005).
Valdés et al., "Effect of Ozone Treatment on Surface Properties of Activated Carbon," Langmuir 2002, 18:2111 (2001).
Wang et al., "Carbon nanotubes synthesized in a hydrogen arc discharge," Appl. Phys.Lett. 1995, 66:2430 (1995).
Wang et al., "Expression of microRNA-497 and its prognostic significance in human breast cancer," Appl. Phys. A 2007, 87:1 (2013).
Zhang et al., "Carbon-based materials as supercapacitor electrodes," Chem. Soc. Rev. 2009, 38:2520 (2009).

\* cited by examiner

B

N

CARBONACEOUS NANOPARTICLES, METHODS OF MAKING SAME AND USES THEREOF

CROSS-REFERENCE TO RELATED APPLICATIONS

This application claims benefit of priority under 35 U.S.C. 119 to U.S. provisional patent application Ser. No. 61/970,988, filed Mar. 27, 2014, and entitled "Carbonaceous Nanoparticles, Methods of Making Same and Uses Thereof," the content of which is herein incorporated by reference in its entirety.

STATEMENT OF GOVERNMENT INTEREST

This invention was made with government support under DMR-0843962 awarded by the National Science Foundation. The government has certain rights in the invention.

FIELD

The present disclosure relates to methods for making carbon-based nanoparticles and their uses in supercapacitors.

BACKGROUND

A supercapacitor, which is also known as an ultracapacitor and formerly known as an electric double-layer capacitor (EDLC)) is a high-capacity electrochemical capacitor with capacitance values up to 10,000 farads at 1.2 volt that bridge the gap between electrolytic capacitors and rechargeable batteries. They typically store 10 to 100 times more energy per unit volume or mass than electrolytic capacitors, can accept and deliver charge much faster than batteries, and tolerate many more charge and discharge cycles than rechargeable batteries. They are however 10 times larger than conventional batteries for a given charge.

Supercapacitors are used in applications requiring many rapid charge/discharge cycles rather than long term compact energy storage: within cars, buses, trains, cranes and elevators, where they are used for recovery energy from braking, short-term energy storage or burst-mode power delivery. Smaller units are used as memory backup for static random-access memory (SRAM).

The salient feature of a supercapacitor is its ability to deliver much higher power density than a conventional battery. Supercapacitors are usually large devices owing to specific design requirements. Supercapacitors are constructed with two metal foils (current collectors), each coated with an electrode material such as activated carbon, which serve as the power connection between the electrode material and the external terminals of the capacitor. Specifically to the electrode material is its very large surface area. The activated carbon is electrochemically etched, so that the surface of the material is about a factor 100,000 larger than the smooth surface.

Supercapacitor electrodes are generally thin coatings applied and electrically connected to a conductive, metallic current collector. Electrodes must have good conductivity, high temperature stability, long-term chemical stability (inertness), high corrosion resistance and high surface areas per unit volume and mass. Other requirements include environmental friendliness and low cost.

The amount of double-layer as well as pseudocapacitance stored per unit voltage in a supercapacitor is predominantly a function of the electrode surface area. Therefore supercapacitor electrodes are typically made of porous, spongy material with an extraordinarily high specific surface area, such as activated carbon. Additionally, the ability of the electrode material to perform faradaic charge transfers enhances the total capacitance.

Generally, the smaller the electrode's pores, the greater the capacitance and energy density. However, smaller pores increase (ESR) and decrease power density. Applications with high peak currents require larger pores and low internal losses, while applications requiring high energy density need small pores. Carbon electrodes for use in superconductors have been made with various carbon sources, including activated carbon, activated carbon fibers, carbon aerogel, carbide-derived carbon, graphene sheets, carbon nanotubes, onion-shaped carbon nanoparticles and template carbon.

BRIEF SUMMARY

In a first aspect, a method of making a carbonaceous nanoparticle is provided. The method includes two steps. The first step includes reacting a first carbon source with a second carbon source in a nitrogen source in a DC arc furnace to form a composite nanoparticle. The second carbon source includes a dopant. The composite nanoparticle includes a crystalline carbon phase having an amorphous phase comprising dopant or carbide. The second step includes removing the amorphous second layer to form the carbonaceous nanoparticle.

In a second aspect, a supercapacitor is provided. The supercapacitor includes a first electrode having a first substrate and carbonaceous nanoparticles; a second electrode comprising a second substrate and carbonaceous nanoparticles; a separator positioned between the first electrode and the second electrode; and an electrolyte. The carbonaceous nanoparticles are preferably made according to the method of the first aspect.

In a third aspect, a method of making an electrode for a supercapacitor is provided. The method includes the several steps. The first step includes applying to a substrate a suspension of a liquid dispersant comprising carbonaceous nanoparticles formed according to the method of the first aspect. The second step includes drying the suspension of carbonaceous nanoparticles on the substrate. The third step includes compacting the dried suspension of carbonaceous nanoparticles on the substrate with a uniaxial pressure less than or equal to 1000 MPa to create an electrode.

These and other features, objects and advantages of the present invention will become better understood from the description that follows. In the description, reference is made to the accompanying drawings, which form a part hereof and in which there is shown by way of illustration, not limitation, embodiments of the invention.

BRIEF DESCRIPTION OF THE DRAWINGS

The features, objects and advantages other than those set forth above will become more readily apparent when consideration is given to the detailed description below. Such detailed description makes reference to the following drawings.

Figure 1A:
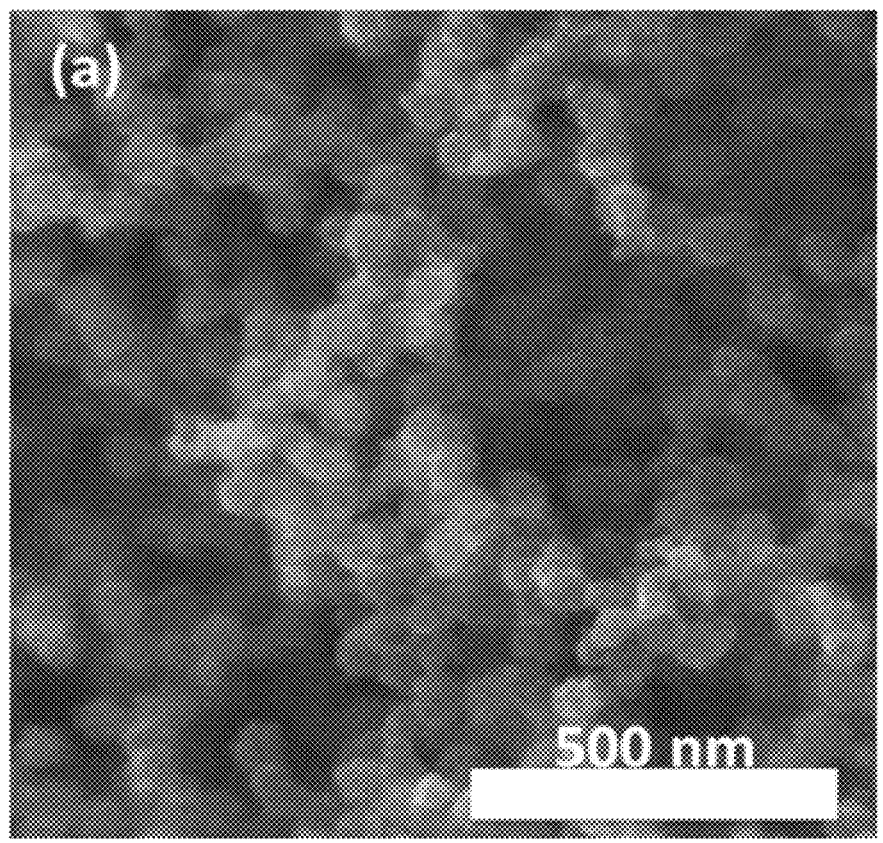
FIG. 1A depicts the morphological characterization of as-synthesized BN—HCDN, wherein high-resolution SEM image of nanoparticles collected from the chamber wall.

While the present invention is amenable to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments and claims herein for interpreting the scope of the invention.

DETAILED DESCRIPTION

The compositions and methods now will be described more fully hereinafter with reference to the accompanying drawings, in which some, but not all permutations and variations of embodiments of the invention are shown. Indeed, the invention may be embodied in many different forms and should not be construed as limited to the embodiments set forth herein. These embodiments are provided in sufficient written detail to describe and enable one skilled in the art to make and use the invention, along with disclosure of the best mode for practicing the invention, as defined by the claims and equivalents thereof.

Likewise, many modifications and other embodiments of the compositions and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Glossary of Terms and Definitions

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one."

As used herein, "about" means within a statistically meaningful range of a value or values such as a stated concentration, length, molecular weight, pH, sequence identity, time frame, temperature or volume. Such a value or range can be within an order of magnitude, typically within 20%, more typically within 10%, and even more typically within 5% of a given value or range. The allowable variation encompassed by "about" will depend upon the particular system under study, and can be readily appreciated by one of skill in the art.

Ranges recited herein include the defined boundary numerical values as well as sub-ranges encompassing any non-recited numerical values within the recited range. For example, a range from about 0.01 mM to about 10.0 mM includes both 0.01 mM and 10.0 mM. Non-recited numerical values within this exemplary recited range also contemplated include, for example, 0.05 mM, 0.10 mM, 0.20 mM, 0.51 mM, 1.0 mM, 1.75 mM, 2.5 mM 5.0 mM, 6.0 mM, 7.5 mM, 8.0 mM, 9.0 mM, and 9.9 mM, among others. Exemplary sub-ranges within this exemplary range include from about 0.01 mM to about 5.0 mM; from about 0.1 mM to about 2.5 mM; and from about 2.0 mM to about 6.0 mM, among others.

Supercapacitor Designs with Nitrogen and Boron Co-Doped Carbon HDCN

A cost-effective approach to fabricate high performance supercapacitors using specially designed and processed nitrogen and boron co-doped carbon HDCN is presented. The process requires assembly of closely-interconnected nanoparticles with large internal/external surfaces and plenty of sub-nanochannels for high speed charge transport. The supercapacitor is formed under 700 MPa of uniaxial pressure to reduce the internal resistance of the device and to improve the power density. This integrated approach provided a power density of nearly 4.58 kW cm$^{-3}$. In addition, an energy density of 2.45 mWhcm$^{-3}$ was also obtained. The described fabrication process can be easily scalable for manufacturing.

The disclosed hierarchical design and assembly of the HCDN is based on vertically integrating optimal materials-performance at each length scale, ranging from the atomic to micrometers in length. At the atomic level, an abundance of active sites for chemical activity and charge accumulation are needed. At this level, doping the carbon with nitrogen and boron will alter its electronic properties as well as seeding the structural change for the growth of the HCDN during synthesis. At the sub-nano level, abundant channels for efficient mass/charge transport of electrolyte species are needed within the nano-structure. At the nano-structure level, it is necessary to assure that the HCDN has a shape for optimum packing of charges and good electrical contact among the HCDN particles for rapid charge transport. Finally, at the micron level, the HCDN must be assembled and mechanically compacted between the two electrodes to deliver the maximum power density. Thus the elastic properties of the HCDN were part of the design consideration. The HCDN synthesis and characterization at each length scale is presented. A discussion of the supercapacitor fabrication and product performance is presented in the examples.

In view of the foregoing, including the examples presented herein, specific aspects of the invention are now presented.

In a first aspect, a method of making a carbonaceous nanoparticle is provided. The method includes two steps. The first step includes reacting a first carbon source with a second carbon source in the presence of a nitrogen source in a DC arc furnace to form a composite nanoparticle. The second carbon source includes a dopant. The composite nanoparticle includes a crystalline carbon phase having an amorphous phase comprising dopant or carbide. The second step includes removing the amorphous second layer to form the carbonaceous nanoparticle.

In one respect of the first aspect, the first carbon source is selected from graphite and carbon black. In another respect, the dopant includes boron. In another respect, the dopant includes boron carbide (B$_4$C). In another respect, the ratio of the weight percent of the first carbon source to the second carbon source comprising is from about 2:1 to about 20:1. In one respect, the ratio of the weight percent of the first carbon source to the second carbon source includes a ratio of about 9:1. In another respect, the nanoparticle includes a substantially spherical shape having nanohorns and nanographene sheets.

In a second aspect, a supercapacitor is provided. The supercapacitor includes a first electrode having a first substrate and carbonaceous nanoparticles; a second electrode comprising a second substrate and carbonaceous nanoparticles; a separator positioned between the first electrode and the second electrode; and an electrolyte. The carbonaceous nanoparticles are preferably made according to the method of the first aspect.

In one respect, the supercapacitor includes a first substrate having a first metal. In another respect, the supercapcacitor includes a first metal having stainless steel. In another respect, the supercapcacitor includes a second substrate having a second metal. In another respect, the supercapcacitor includes a second metal having stainless steel. In another respect, the supercapcacitor includes a separator having plastic. In another respect, the supercapcacitor includes a plastic having polypropylene. In another respect, the supercapacitor includes a plastic having a composition resistant to attack by acids and bases. In another respect, the supercapcacitor includes an electrolyte comprising potassium hydroxide. In another respect, the supercapcacitor includes an energy density greater than or equal to about 2 mMwh/cm$^3$. In another respect, the supercapcacitor includes a power density of greater than or equal to about 4 kW/cm$^3$.

In a third aspect, a method of making an electrode for a supercapacitor is provided. The method includes the several steps. The first step includes applying to a substrate a suspension of a liquid dispersant comprising carbonaceous nanoparticles formed according to the method of the first aspect. The second step includes drying the suspension of carbonaceous nanoparticles on the substrate. The third step includes compacting the dried suspension of carbonaceous nanoparticles on the substrate with a uniaxial pressure less than or equal to 1000 MPa to create an electrode.

In one respect of the third aspect, the liquid dispersant comprises an alcohol. In some respect, the alcohol is selected from a group consisting of ethanol, methanol and isopropyl alcohol. In another respect, the substrate comprises a metal. In some respects, the metal comprises stainless steel. In other respects, the first step of applying comprises spraying. For example, in some respects, spraying comprises electro-spraying.

In other respects, the third aspect includes additional steps, such as repeating the steps to create an additional electrode. In this regard, the electrode of this aspect further includes the step of providing a separator. In some respects, separator comprises plastic. In other respects, the plastic comprises polypropylene.

In yet other respects, the method includes additional steps of sandwiching the separator between the electrodes to create a dry supercapacitor. In this regard, the method includes an additional step of providing electrolyte. In this regard, the electrolyte comprises potassium hydroxide. In this regard, the method further includes the step of soaking the dry supercapacitor with the electrolyte to create the supercapacitor.

EXAMPLES

The invention will be more fully understood upon consideration of the following non-limiting examples, which are offered for purposes of illustration, not limitation.

Example 1

Nanoparticle Design and Synthesis

BN—HCDN Fabrication and Structural Analysis

The first goal is to synthesize a HCDN with near spherical shape consisting of doped crystalline frame-work having numerous internal nano-channels and sharp tips for the transport and accumulation of charges. To achieve such an architecture the following two-step processing sequence was taken to synthesize the unique HCDN: First, a composite nanoparticle was synthesized consisting of fine lamella layers of crystalline carbon sandwiched between amorphous layers of nitride and/or carbide materials. Second, the amorphous layers of the composite nanoparticle were selectively etched away by heating the sample in air at 450° C. to produce the desired structure.

DC arcs have been extensively used in nano-carbon studies [see, for example, V. P. Dravid et al., *Science* 1993, 259:1601; X. K. Wang et al., *Appl. Phys. Lett.* 1995, 66:2430; N. Li et al., *Carbon* 2010, 48:255; B. Lee et al., *Energy Environ. Sci.* 2012, 5:6941; X. Lin et al., *Appl. Phys. Lett.* 1994, 64:181]. To perform the first step, a DC arc was configured as a high temperature furnace where a hole in the cathode serves as a crucible that can be filled with materials to be incorporated into the products [S. P. Doherty et al., *Carbon* 2006, 44:1511]. An optimal mixture of 90% graphite powder and 10% $B_4C$ powder was used to synthesize the HCDN particles. $B_4C$ was used primarily as a source for boron doping; nitrogen gas was used as the nitrogen source for co-doping. The arc was operated with high purity nitrogen at 300 Torr and a temperature around 3,000° C. Under these conditions, a composite HCDN was obtained as proposed in step one described above. Nitrides and carbides in the HCDN remain amorphous while carbon achieved its crystalline form. (Note: HCDN samples were also synthesized with pure hydrogen and nitrogen gas only. However, the electrical-chemical properties of these samples were inferior, most likely due to their structural properties. Thus, this study focused on the B-N co-doped samples.)

Figure 1B:
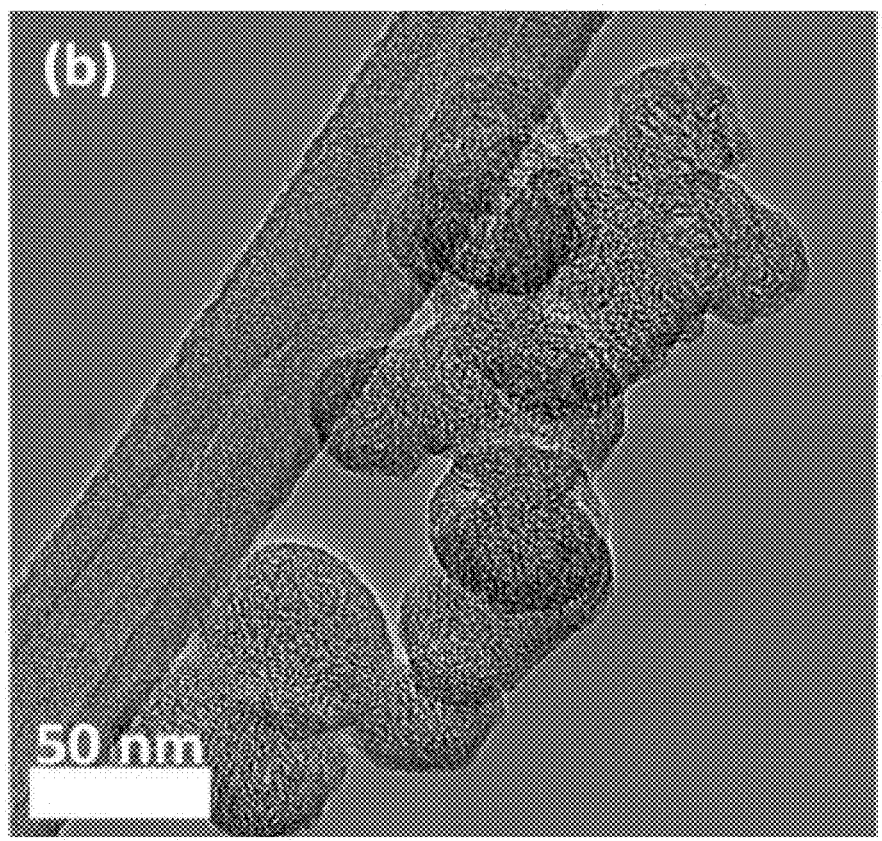
FIG. 1B depicts TEM image of a cluster of these nanoparticles on a holey carbon grid.
Figure 1C:
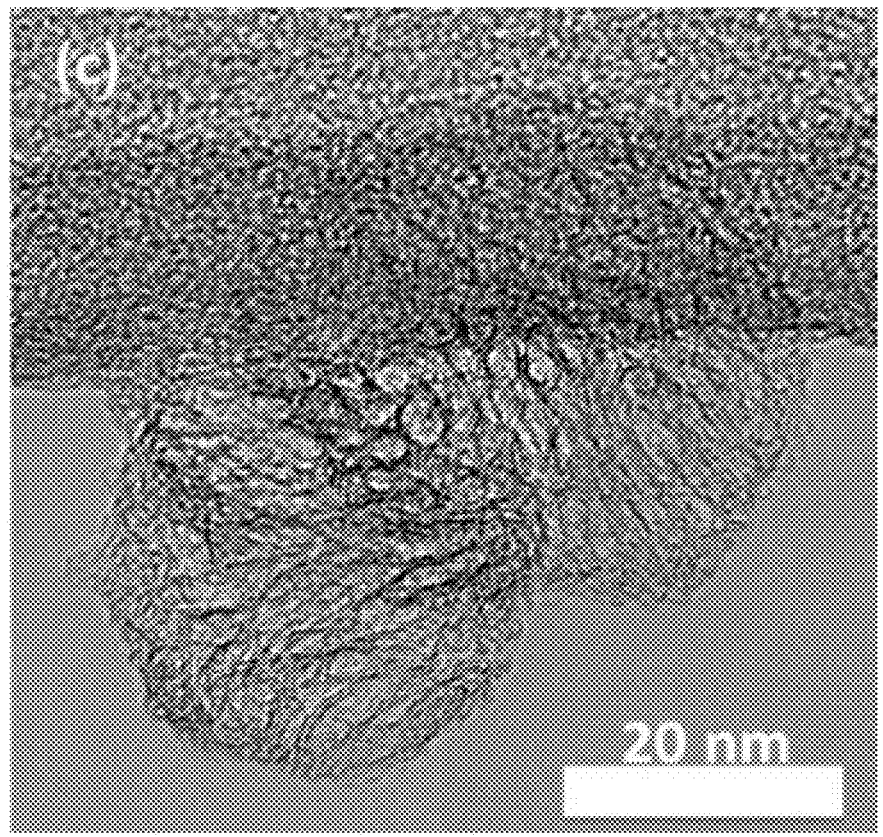
FIG. 1C depicts high-resolution TEM images of as-synthesized BN—HCDN.
Figure 2A:
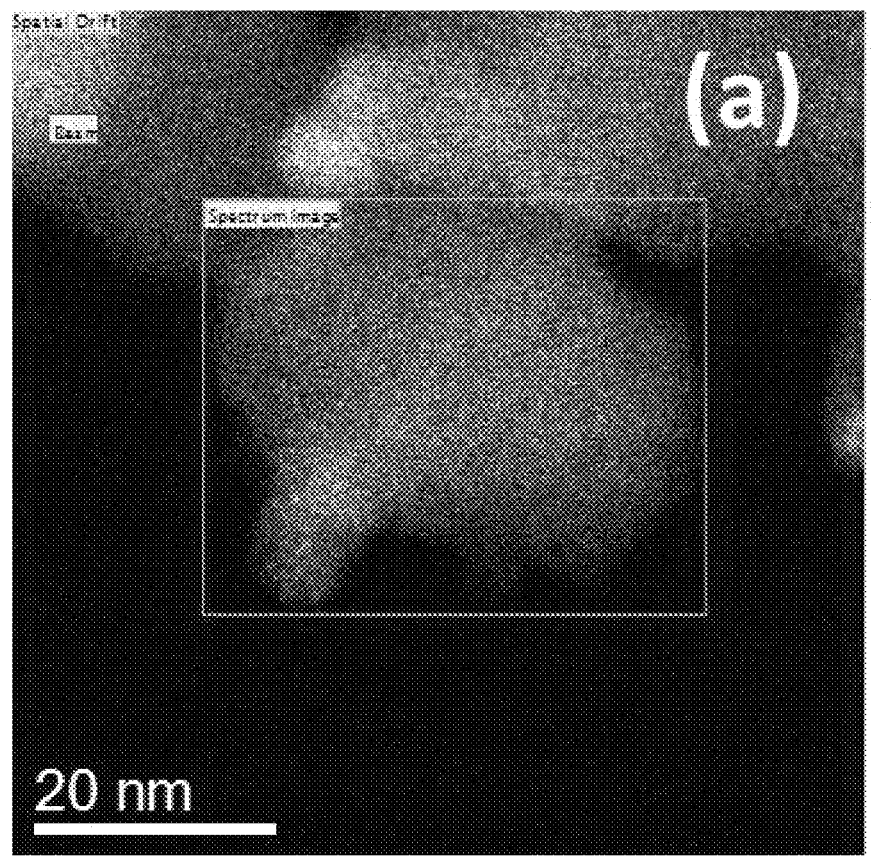
FIG. 2A shows EELS analysis results for the as-synthesized BN—HCDN, wherein STEM image of as elected BN—HCDN to be mapped by EELS.
Figure 2B:
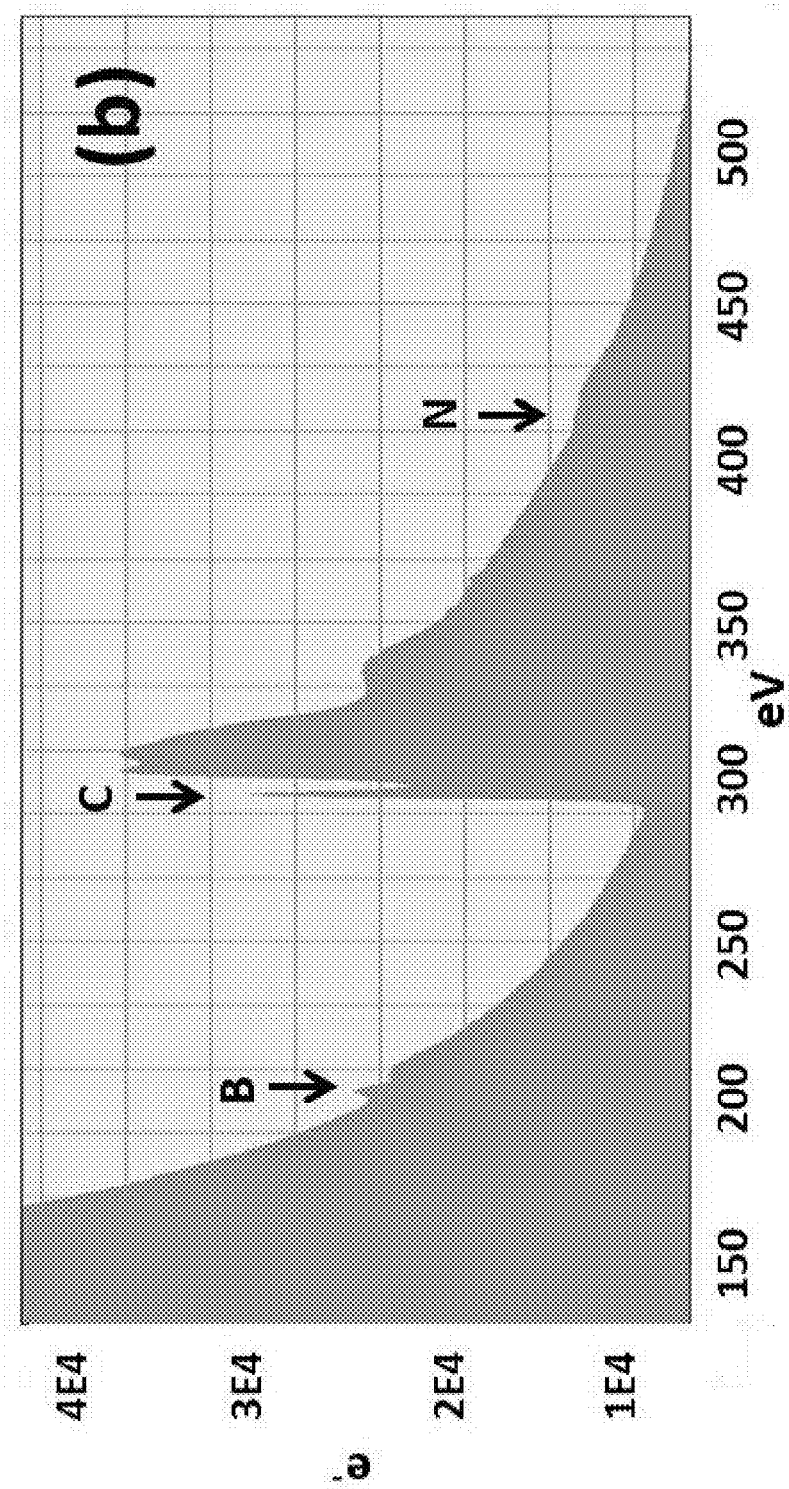
FIG. 2B shows EELS spectrum of particle from FIG. 2A showing the B, C, and N edges of EELS.
Figure 2C:
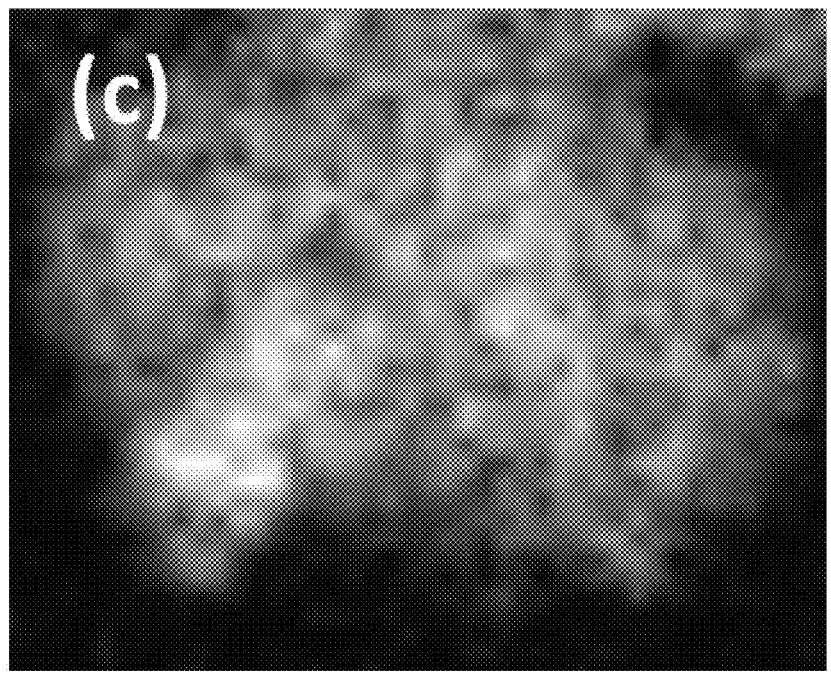
FIG. 2C shows elemental mapping image of B (188-208 eV).
Figure 2D:
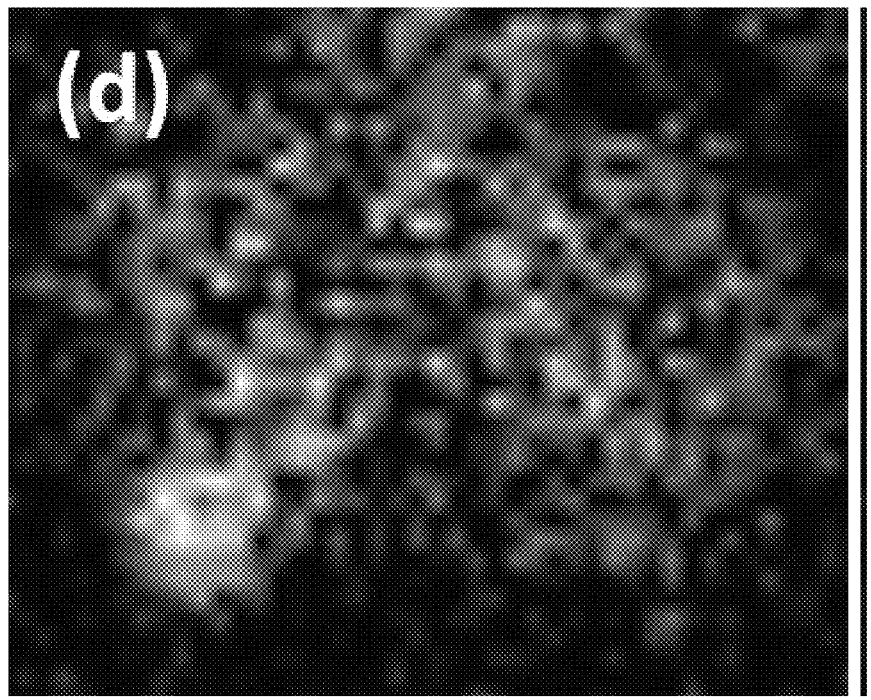
FIG. 2D shows elemental mapping image of N (401-421 eV).
Figure 2E:
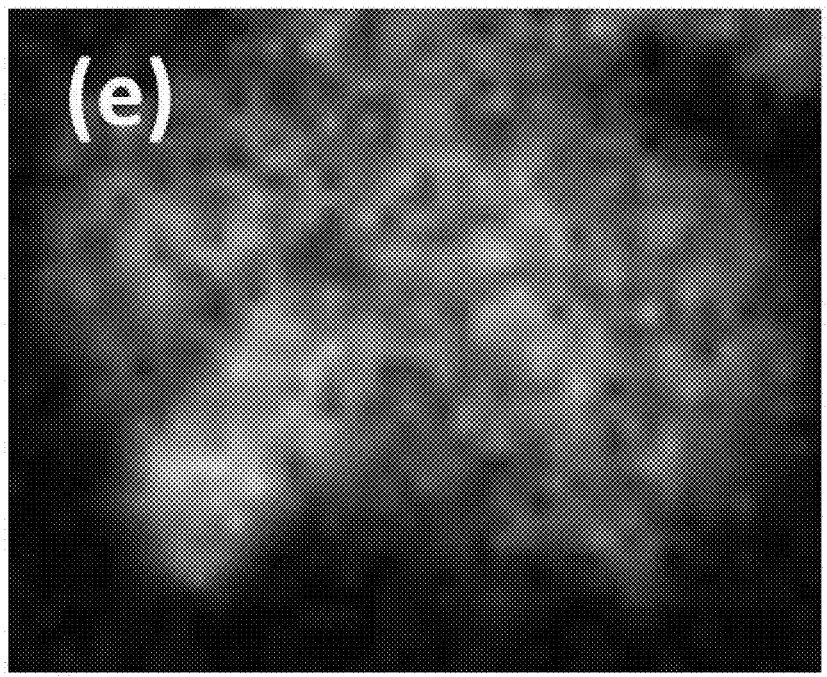
FIG. 2E shows the over lay image of FIGS. 2C and 2D.

The morphology of the as synthesized B-N co-doped HCDN (BN) collected from the chamber wall is shown in the SEM image (FIG. 1A). The spherical particles are quite uniform in size, and they range between 40-60 nm. A transmission electron microscopy (TEM) image, FIG. 1B, provides a closer view of a cluster of these particles on a holey carbon grid. FIG. 1C is a higher magnification of a composite particle showing the crystalline carbon as the matrix embedded with amorphous materials. To study the composition of the as synthesized HCDN, electron energy loss spectroscopy (EELS) was used to map the locations of B, N, and C in the individual particles, and X-ray photoelectron spectroscopy (XPS) was used to study the average amount of each element and their local bonding environment over an assembly of nanoparticles. FIG. 2A shows a scanning transmission electron microscopy (STEM) image of a selected nanoparticle mapped by EELS. STEM images and EELS were acquired in a probe-corrected JEOL ARM200F equipped with a GIF Tridiem operated at 80 kV. The electron energy loss spectrum of the whole nanoparticle clearly shows the B, C, and N edges (FIG. 2B). From this mapping (FIGS. 2C-E) it is clear that both B and N are uniformly present across the nanoparticle indicating that the crystalline and amorphous phases of the composite HCDN are homogeneously distributed within the particle.

Figure 3A:
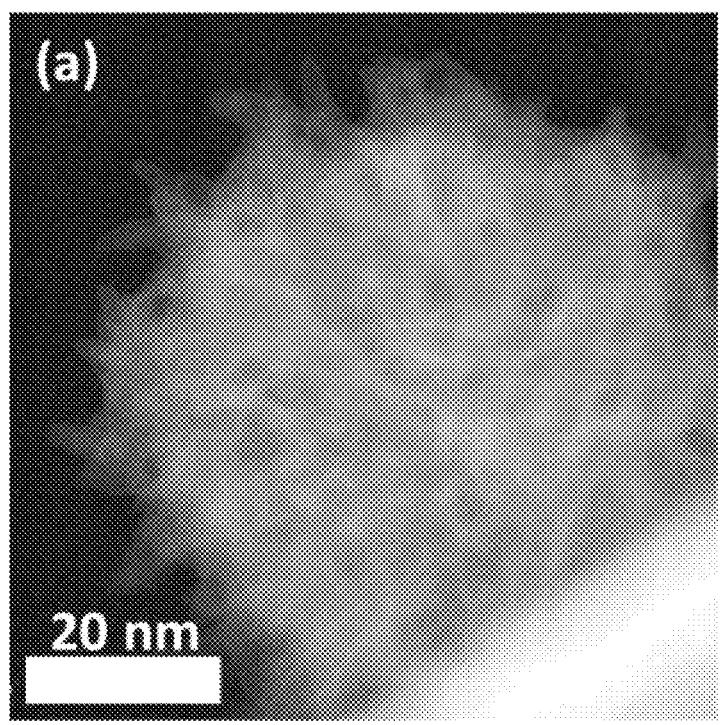
FIG. 3A illustrates the morphological characterization of annealed BN—HCDN (BN-1H), wherein high-resolution annular dark field-STEM images are shown.
Figure 3B:
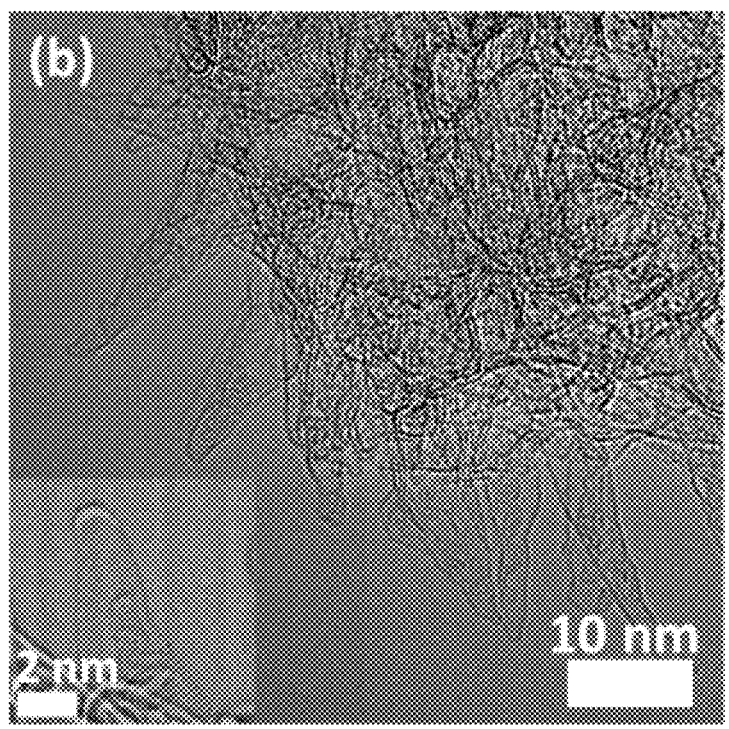
FIG. 3B illustrates bright field high-resolution STEM images of single BN-1H particle.
Figure 3C:
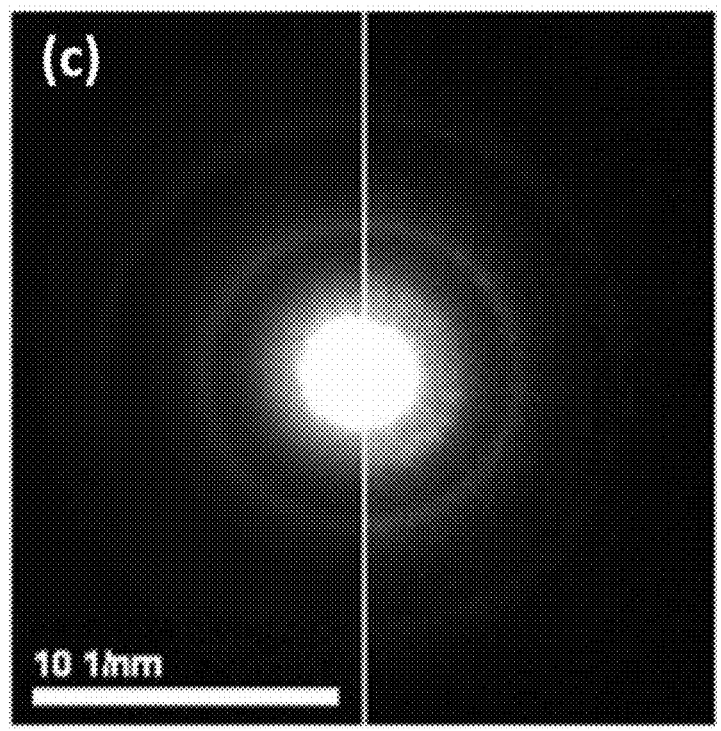
FIG. 3C illustrates a comparison of electron diffraction patterns between as-synthesized BN—HCDN (left) and BN-1H (right). Bright spots in the right half indicate graphitic (crystalline) characteristics of BN-1H, compared with the hazy pattern of as-synthesized BN—HCDN in the left half.

In the second step of the synthesis, the amorphous materials in the composite HCDN was selectively etch-removed by heating the sample at 450° C. in air. FIG. 3A is an annular dark field image of a typical nanoparticle (BN-1H) after 1 hour of treatment to remove the amorphous material from the nanoparticles. It shows how the dense nano-composite particle has transformed into a nano-porous particle. By further focusing on a single nanoparticle (FIG. 3B), it is quite revealing to see the transformation of a compact composite nanoparticle into a crystalline carbon "skeleton" framework, which consists of densely populated inter-nested carbon nano-horns [M. Yudasaka et al., *Carbon nanotub.* 2008, 111:605] and twisted nano-graphite sheets. The inset to FIG. 3B shows the fine structure of a typical nano-horn. An electron diffraction pattern (FIG. 3C) was obtained from as deposited BN—HCDN (left half circle) and after 1-hour heat treatment, BN-1H (right half circle). The existence of diffraction spots in the rings indicates the presence of randomly oriented carbon crystallites in the BN-1H sample. From the TEM images, it is clear that nanochannels have been created within the particle that will improve charge transport. Second, the presence of horn-shaped nanostructures will help to induce charging effects around their tips and promote local chemical activities. Thirdly, the interconnection among the annealed HCDN particles will further enhance the charge flow among the assemblies of these nanoparticles.

BN—HCDN Nanoparticle Porosity

Figure 4A:
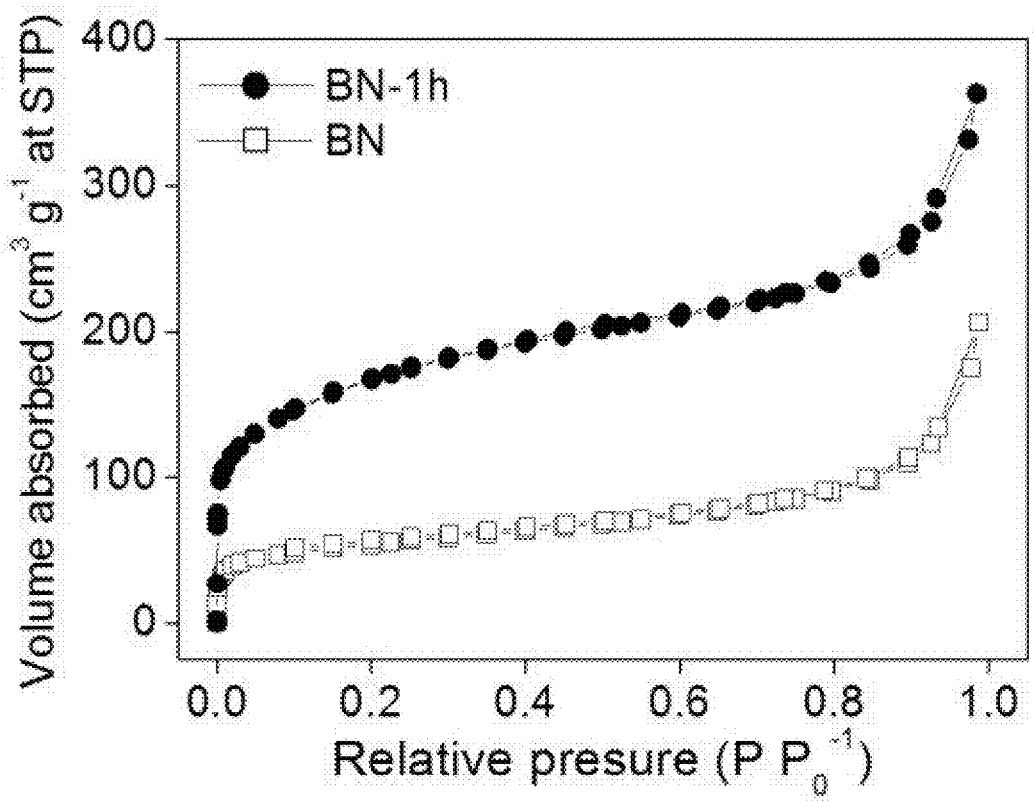
FIG. 4A illustrates a porosity analysis from the BET measurement, wherein gas adsorption/desorption analysis using N2 (77.4 K) of the BN—HCDN before and after the annealing process for high-resolution N2 isotherms.

While it is clear from the micrographs that selective etching can transform a dense composite HCDN particle into a highly nano-porous crystalline carbon nanoparticle, it is also desirable to quantify the change in porosity that takes place. To this end, a Brunauer-Emmett-Teller (BET) pore structure analysis was carried out. The isotherms are Type II IUPAC classification without adsorption hysteresis (FIG. 4A). The observed adsorption isotherm appears to be representative of an adsorption isotherm on a flat surface. The etching process results in a remarkably enhanced $N_2$ adsorption uptake at low relative pressure ($P/P_0$), which is indicative of a huge increase in nanoporosity. Moreover, continuous $N_2$ uptake can be observed in the relative pressure range of 0.3~0.6, which also implies the presence of large increase in porosity. The pore size distribution was calculated using the quenched solid density functional theory (QSDFT) method that was part of the Quarda Win software package (Quanta chrome Instruments, USA), assuming a slit pore geometry. From this analysis there is only a minor amount of pores with characteristics in the micropore range for the as synthesized BN sample.

Figure 4B:
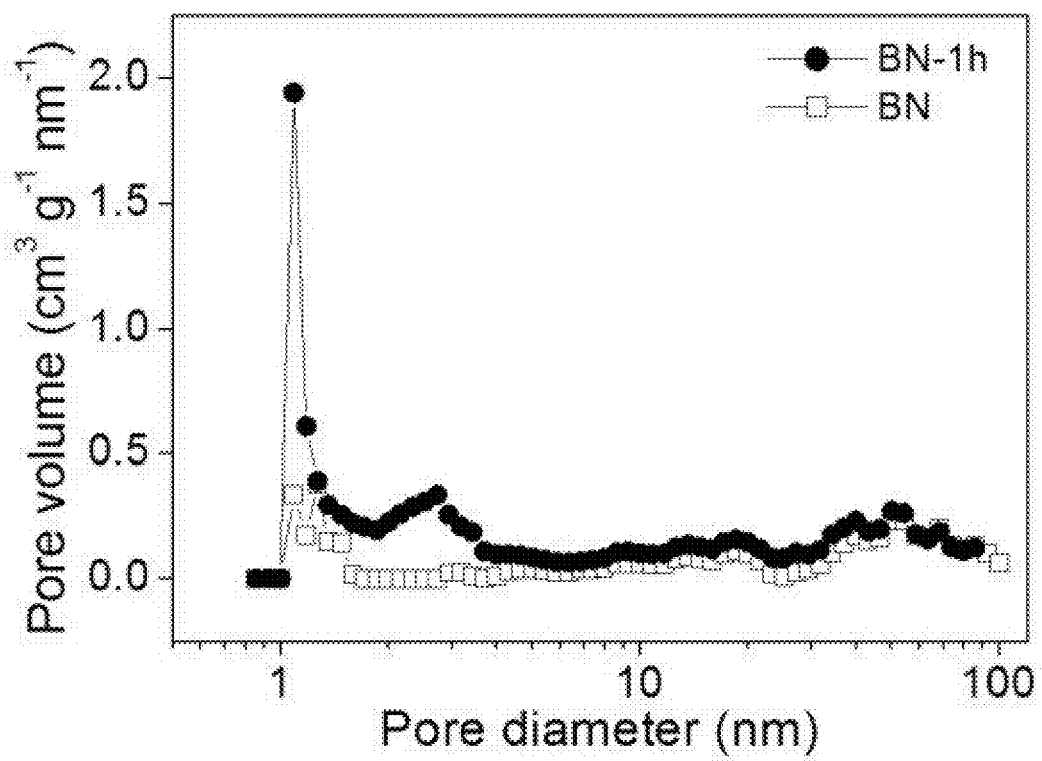
FIG. 4B depicts the pore-size distribution of FIG. 4A (calculated by using a slit NLDFT model).

On the other hand, there are two obvious peaks in the micropore range for the etched sample: one very sharp peak just above 1 nm and another broad peak (with one tenth the height) between 2-3 nm (FIG. 4B). This dramatic increase in pore volume around 1 nm can be attributed to the presence of numerous nanochannels and/or sub-nanochannels formed by the intertwined nano-carbon layers and nano-horns left behind in the etched nanoparticle discussed above [S. Bandow et al., *Chem. Phys. Lett.* 2000, 321:514; S. Utsumi et al., *J. Phys. Chem. B* 2005, 109:14319]. As a result, the surface area and pore volume of the etched sample increase over the unetched sample from 193.3 $m^2$ $g^{-1}$ to 554.3 $m^2$ $g^{-1}$, and from 0.27 $cm^3$ $g^{-1}$ to 0.51 $cm^3$ $g^{-1}$, respectively. It should be pointed out here that these values remain nearly the same after the HCDN film is compacted with a pressure of 700 MPa.

BN—HCDN XPS Analysis

Figure 5A:
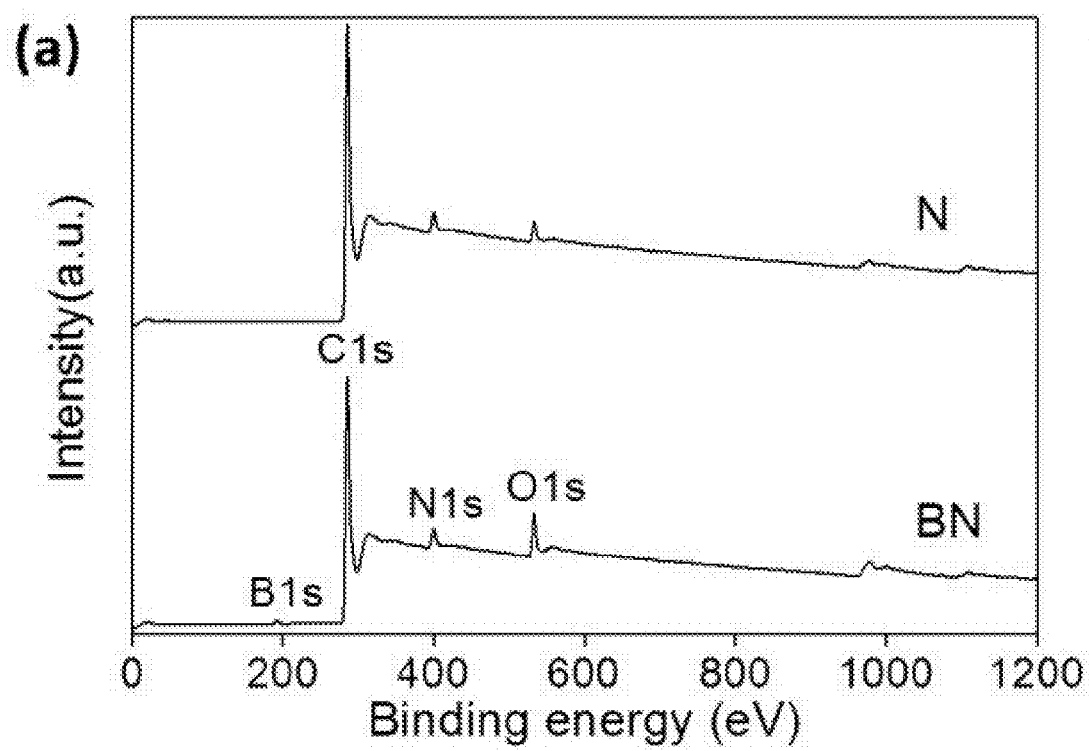
FIG. 5A depicts XPS spectrum analysis for the N, BN, and BN-1H samples for a survey spectrum.

Extensive XPS studies were performed on the BN and BN-1H particles. From the survey spectrum of the N and BN samples (FIG. 5A) indicates the incorporation of N and B into these materials. The nitrogen and boron concentrations in the as grown co-doped sample, BN, are about 4 at % and 3 at % respectively (Table 1).

TABLE 1

Summary of XPS peak analysis for N, BN, and BN-1H samples.

| | C[1] | | | | B[2] | | | | N[3] | | | |
|---|---|---|---|---|---|---|---|---|---|---|---|---|
| Sample | C-B | C-C | C-N | C-O | Content | B-C | B-N | B-CO$_2$ | B-O | Content | N-6 | N-5 | N-Q |
| N | — | 60.9% | 21.1% | 18.0% | — | — | — | — | — | 4.0 at % | 71.7% | 21.8% | 6.5% |
| BN | 6.7% | 69.7% | 13.2% | 10.4% | 3.0 at % | 18.7% | 50.5% | 30.8% | — | 4.1 at % | 58.8% | 36.6% | 4.6% |
| BN-1h | 3.6% | 72.3% | 10.5% | 13.5% | 0.8 at % | 15.7% | 48.7% | 27.7% | 7.9% | 2.2 at % | 41.1% | 51.1% | 7.8% |

[1] C-B (283.4 eV), C-C (284.6 eV), C-N (286.2 eV), and C-O (288.3 eV)
[2] B-C (189.5 eV), B-N (190.6 eV), B-CO$_2$ (192 eV), and B-O (193 eV)
[3] N-6 (Pyridinic-398.5 eV), N-5 (Pyrrolic-400.5 eV), and N-Q (Quaternary-401.2 eV)

Figure 5B:
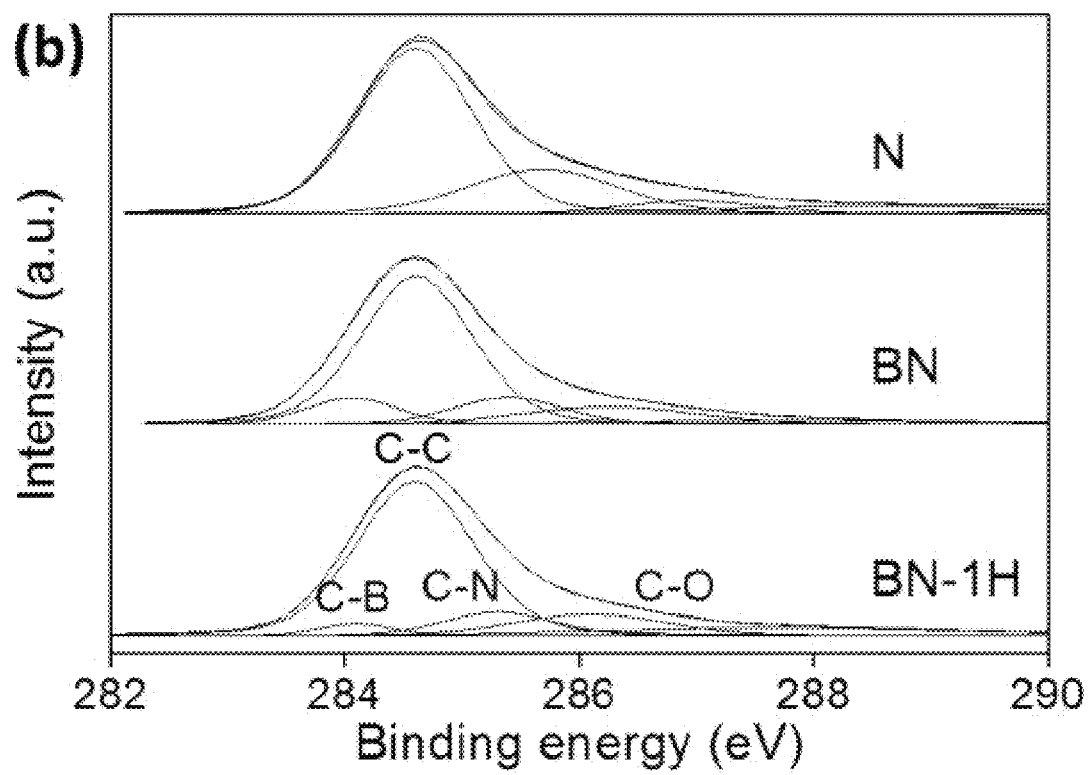
FIG. 5B depicts a high-resolution spectrum of C 1 s.
Figure 5C:
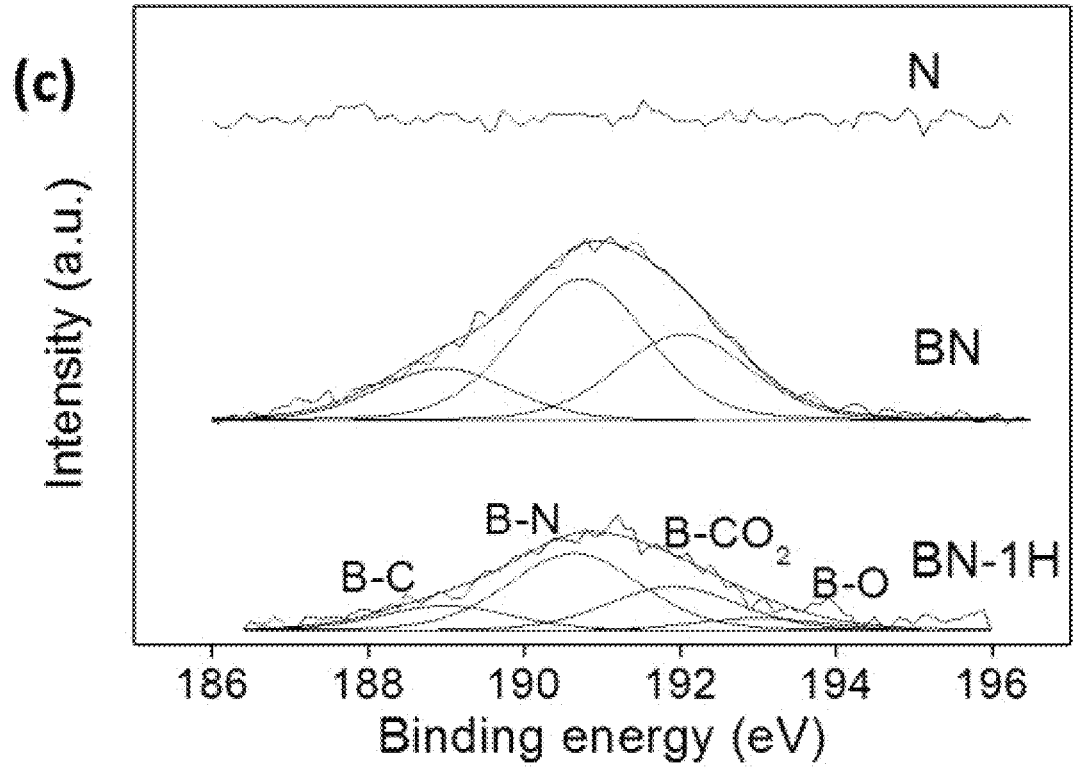
FIG. 5C depicts a high-resolution spectrum of B 1 s.
Figure 5D:
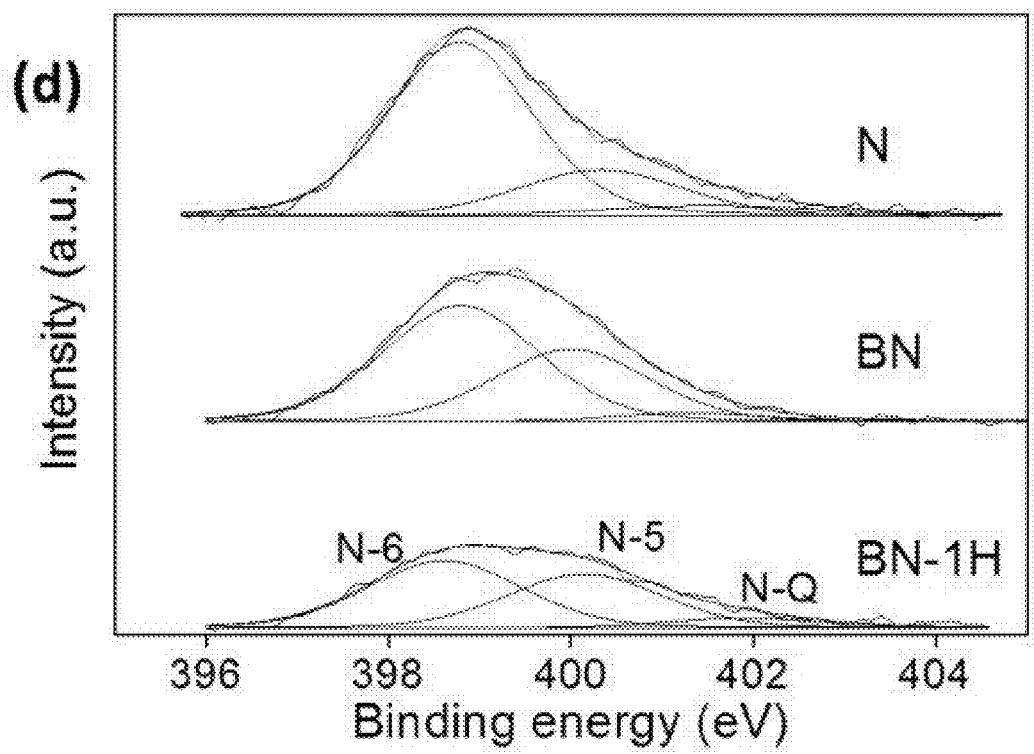
FIG. 5D depicts a high-resolution spectrum of N 1 s.

The predominate asymmetric C 1 s peak, shown in FIG. 5B, indicates the existence of C—N, C—B, and/or C—O bonds in addition to C—C bonds. The C 1 s spectrum could be deconvoluted into four peaks at 283.5, 284.7, 286.3, and 288.4 eV; these were assigned to C—B, sp2 C═C, C—N, and/or C—O bonds, and π-π sp$^2$ satellite transitions respectively [S. Maldonado et al., Carbon 2006, 44:1429; W. J. Hsieh et al., Carbon 2005, 43:820; P. Hammer et al., J. Vac. Sci. Technol. A 2000, 18:2277; H. Valdés et al. Langmuir 2002, 18:2111; K. László et al., Carbon 2001, 39, 1217; Y. C. Lin et al., Appl. Phys. Lett. 2010, 96:133110; S .T. Jackson et al., Appl. Surf. Sci. 1995, 90:195]. The B1 s core level can be divided into maximum 4 peaks of B—O (193 eV), BCO$_2$ (192 eV), B—N (190.6 eV) and B—C (189.5 eV) (FIG. 5C) [W. J. Hsieh et al. Carbon 2005, 43:820; Y. Kang et al., Carbon 2013, 61:200; S. H. Sheng et al., J. Mater. Chem. 2012, 22:390]. The relatively large amount of B—N bonding indicates that N from the reaction gas reacts preferentially with B over C when B is present. The high resolution N1 s peak can be deconvoluted into 3 components (FIG. 5D); N-6 (398.6 eV), N-5 (400.6 eV), and N-Q (401.6 eV) [W. J. Hsieh et al., Carbon 2005, 43:820; Y. C. Lin et al. Appl. Phys. Lett. 2010, 96:133110]. N-6 corresponds to pyridinic substitution in the carbon lattice, N-5 to pyrrolic substitution in the carbon lattice and/or B—N bonding, and N-Q to graphitic substitution in the carbon lattice. Considering large amount of B—N bonding indicated from the B1 s spectra, it can be assumed that there are also large amount of N—B bonding, along with the pyrrolic N substitution, in peak N-6 in the B doped samples. As depicted above, due to the nature of ternary mixture in BN sample, there are large amount of different bonding at lower binding energy comparing with N sample (including N-6 and N-5). Although the amount of B and N were somewhat decreased by the 1h annealing, sufficient quantities of B (0.8 at %) and N (2.2 at %) remain to change the surface chemistry of the BN-1h sample thereby increasing its electrochemical activities. Moreover, it should be noted that most of the nitrogen species present are as pyridinic (N-6) and pyrrolic (N-5) substitution. This is because nitrogen can act as an edge termination agent during the graphene growth in a role similar to hydrogen in a hydrogen arc growth [Y. C. Lin et al., Appl. Phys. Lett. 2010, 96:133110]. These N-6 and N-5 species are favorable for accumulating charges during supercapacitor operation due to their appropriate electron configuration and binding energy [F. M. Hassan et al., J. Mater. Chem. A 2013, 1:2904]. Nitrogen bonding around the nanographitic edges favors pyridinic substitution [Lin et al. (2010)]; density function theory (DFT) calculation indicates this should produce a p-type material [D. Usachov et al., Nano Lett. 2011, 11:5401]. XPS also indicates pyrrolic N-substitution where the Fermi level is in the middle of the gap. After annealing in air, the amount of oxygen species (such as hydroxyl, ester, ketone, and carboxylic groups) on the surface of the HCDN were slightly increased from ca. 7 at % to 10 at %. Addition of these groups further enhances the redox reaction for more charge accumulation, and also increases the hydrophilic surface property for better wettability of the materials, which eventually increase the overall electrochemical performance of BN-1H HCDN [M. Inagakia et al., J. Power Sources 2010, 195:7880]. The difference in surface wettability of these samples with contact angle measurements was shown, wherein the BN-1H sample has the best wettability.

BN—HCDN Sample Densification

The HCDN nanoparticles were compacted or densified into a film under uniaxial pressure for the fabrication of supercapacitors. The densification of the HCDN film is needed to optimize the device performance to obtain both the highest energy density and power density. This requires the optimization of at least two important parameters: charge density (amount of charge per volume) stored in the capacitor, and the supercapacitor charging and discharging rate (which requires the minimization of internal resistance of the device). In addition, the device needs to possess long-term stability through cycling. Densification is thus a key step to achieving these properties. To assure the nanoparticle film was not over-compressed (beyond its elastic limit), in-situ nano-indentation measurements were performed on single selected BN-1H HCDN particles in a HR-TEM. An AFM-TEM in situ holder from Nanofactory AB was used to perform the compression experiments [G. Casillas et al., Philos. Mag. 2012, 92:4437; G. Casillas et al., Jose-Yacaman, Nanoscale. 2013, 5:6333]. Briefly, the nanoparticles are drop-casted onto an Au wire, which is mounted in to the AFM-TEM holder and once inside the TEM, they are compressed by a Si tip. The deflection of the cantilever is used to compute the load applied on the particles and the area of contact is estimated from the TEM images. The results showed that a single nanoparticle was able to withstand ~1000 MPa of stress at the contact point without any deformation (except for the sharp tips). Beyond this stress the nanoparticle started to compress plastically. According to these results, an uniaxial pressure of 700 MPa was used to ensure that the nanoparticles were not damaged in the film formation process discussed below (See, for example the BET isotherm result for compressed BN-1H sample).

BN—HCDN Electrical Measurement

Hall measurements were performed on normally ~300 μm thick BN-1H co-doped HCDN films. The HCDN particles were compacted under a uniaxial pressure of 700 MPa to form the films. The Hall mobility was determined to be ~2 cm$^2$V$^{-1}$·s$^{-1}$ with a p-type carrier density of $5 \times 10^{19}$ cm$^{-3}$ to yield a conductivity of ~15 S cm$^{-1}$. This carrier density is about one order of magnitude higher than an N-doped sample grown in the nitrogen arc without boron doping, while the p-type mobility is the same. Thus, the BN co-doped sample is more conductive by roughly a factor of 10. This information is very important to the design of the supercapacitor. To achieve high rates of charging and discharging, the internal resistance of the device needs to be very low.

BN—HCDN Electrochemical Analysis

Figure 6A:
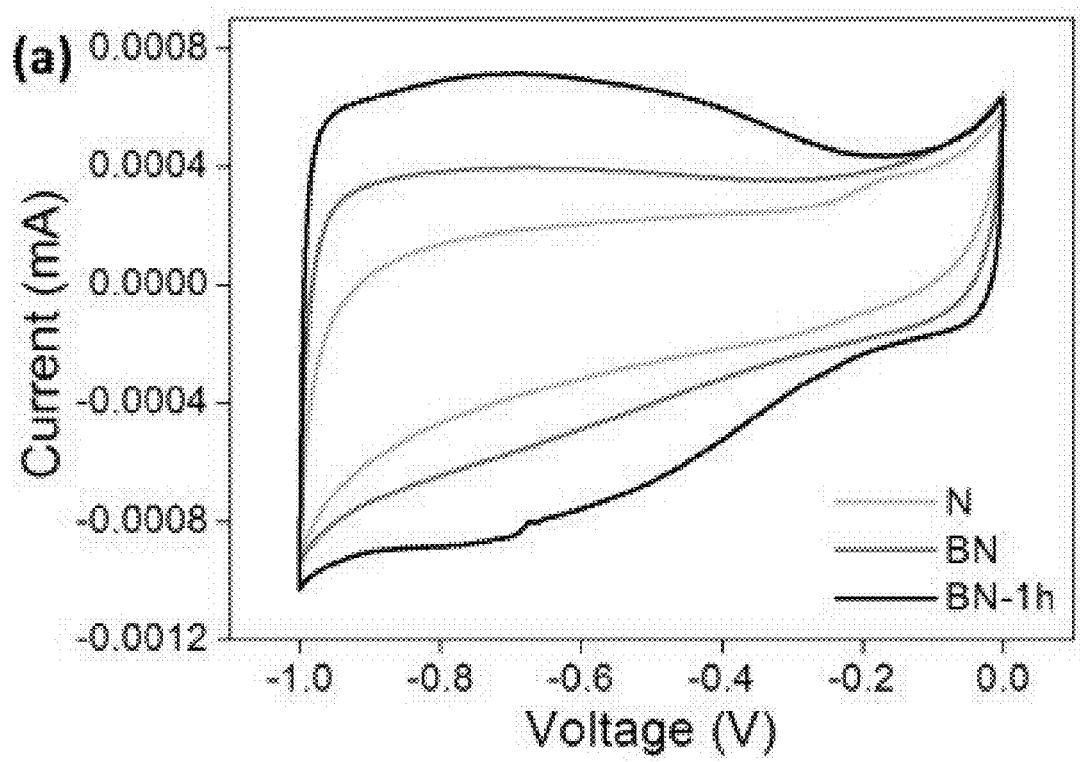
FIG. 6A illustrates electrochemical characterization in three electrode configuration in a comparison study among the samples of N, as-synthesized BN, and BN-1H, wherein CV curves measured in 6 M KOH electrolyte from −1.0 to 0 V at 100 mV s$^{-1}$.
Figure 6B:
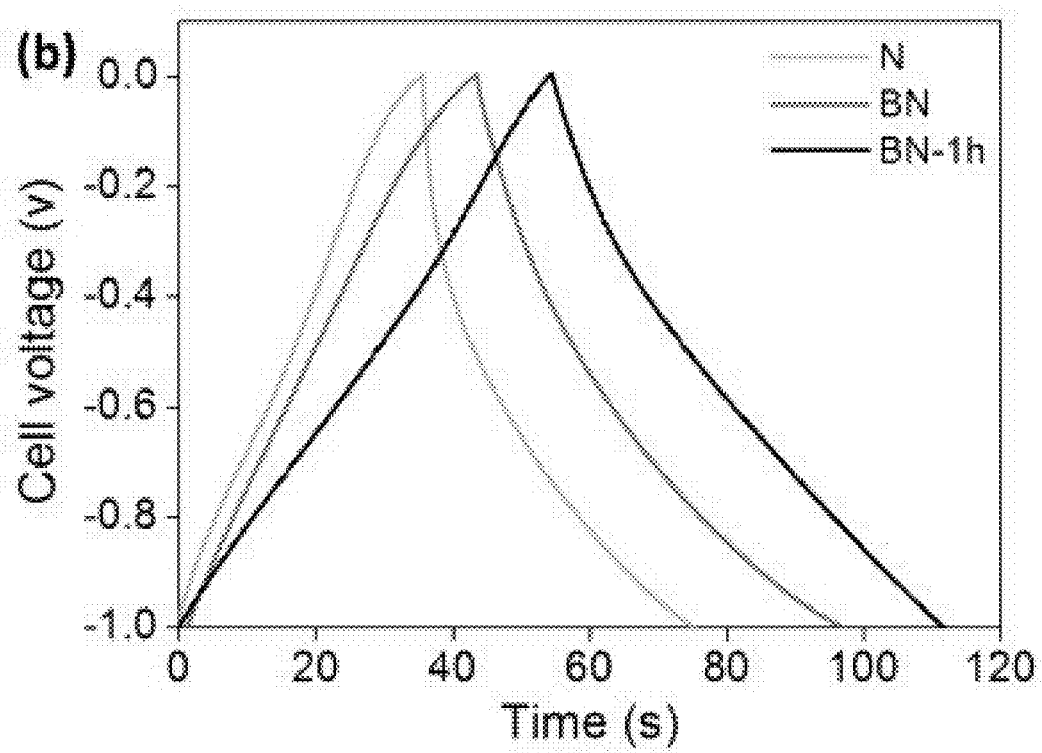
FIG. 6B illustrates galvanostatic charge/discharge profiles at the current density of 3 A g$^{-1}$.

As a demonstration of the advantage of its unique structure, the electrochemical activity of B—N co-doped HCDN material was compared with N-doped HCDN samples using a three-electrode cell. FIG. 6A shows typical cyclic voltammograms (CV) for a three-electrode cell in 6 M KOH at a scan rate of 100 mVs$^{-1}$. The as-deposited BN—HCDN exhibits a much larger CV curve than the N sample corresponding to superior electrochemical activities for storing charges. Considering the similar values for surface area (193.3 m$^2$g$^{-1}$ for the BN sample and 215 m$^2$g$^{-1}$ for the N sample), the increase in electrochemical activity is attributed to the synergetic effect of B—N co-doping in the carbon structure as discussed earlier. Sharp response at the voltage changing point represents the fast charge/discharge characteristics owing to the favorable surface chemical properties of B—N co-doping effects. Heteroatom doping in the carbon framework changes the electronic properties of the material with the heteroatoms being more favorable for the attraction of ions in the electrolyte compared to that of the carbon atoms, thus inducing pseudo capacitance [F. M. Hassan et al., *J. Mater. Chem. A* 2013, 1:2904]. Additionally, the presence of heteroatoms in the carbon matrix can enhance the wettability (hydrophilicity) between electrolyte and electrode materials [E. Iyyamperumal et al., *ACS Nano* 2012, 6:5259]. Therefore, the heteroatom doping could not only introduce extra pseudo capacitance but also enhance the electric double-layer capacitance. The B—N co-doped synergetic effect becomes more significant after 1-hour annealing process. Due to the highly increased conductivity of the BN-1H sample relative to the BN sample, faster response can be obtained resulting in a nearly rectangular shaped CV curve. Moreover, characteristics of the redox reaction became more obvious showing the appearance of "humps" in the CV curves (FIG. 6A). Capacitive behaviors can also be observed, exhibiting linear behavior during the galvanostatic charge/discharge experiments performed at 3 Ag$^{-1}$ (FIG. 6B). The specific capacitance of BN-1H sample was calculated from the discharging curves with values of as high as 277 Fg$^{-1}$ at a current density of 0.2 Ag$^{-1}$.

Figure 6C:
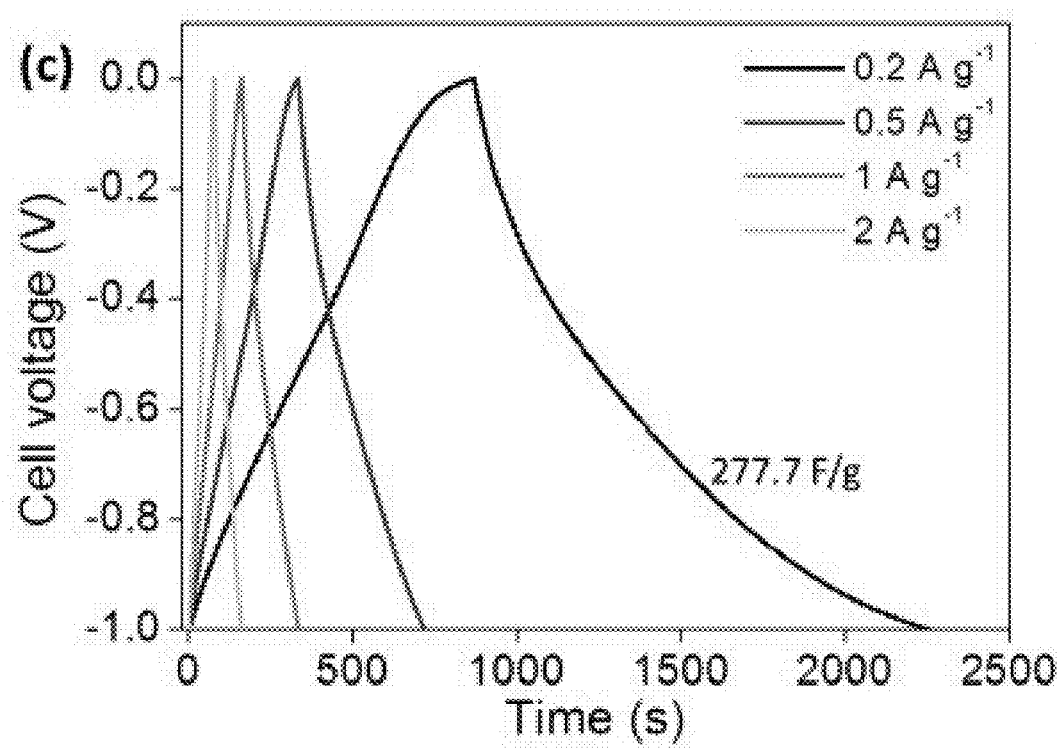
FIG. 6C depicts an in-depth study of BN-1H, wherein Galvanostatic charge/discharge profiles at different current densities obtained in 6 M of KOH.
Figure 6D:
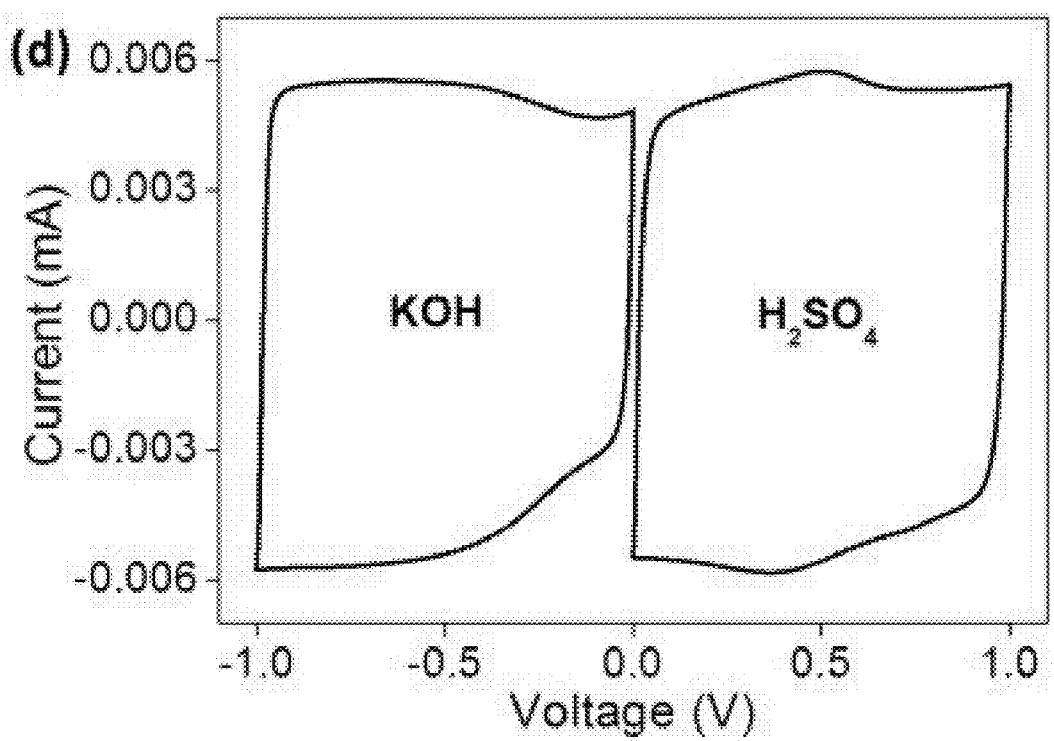
FIG. 6D depicts CV curves obtained in different electrolyte systems of 6 M KOH and 1 M of $H_2SO_4$ at scan rate of 1 V s$^{-1}$.
Figure 6E:
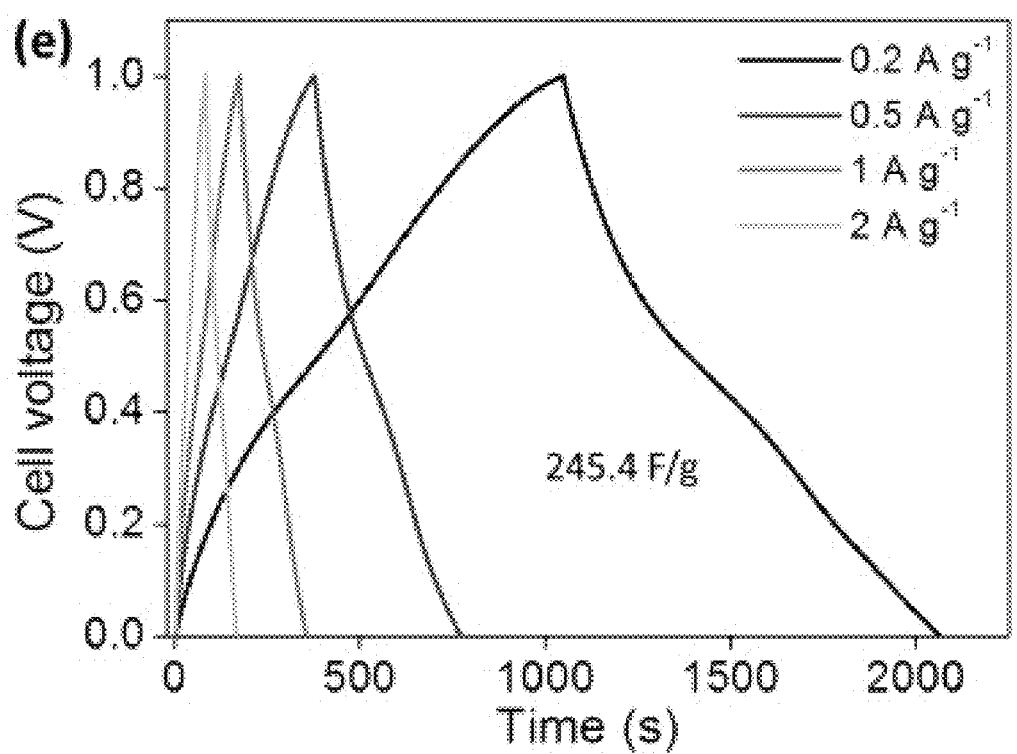
FIG. 6E depicts an in-depth study of BN-1H, wherein Galvanostatic charge/discharge profiles at different current densities obtained in 1 M of $H_2SO_4$.

For the further validation of the advantages of B—N co-doping, an electrochemical activity test was also performed in acidic media (1 M of H$_2$SO$_4$). FIG. 6C shows charging/discharging scans as a function of current for 6 M KOH solution, while FIG. 6E shows that for 1 M H$_2$SO$_4$ solution. FIG. 6D compares the differences in the electrolyte solutions in C—V plots. The specific capacitance of the BN-1H was calculated from galvanostatic charge/discharge curves according to the relation $C_{spec}=I \cdot tm^{-1} \cdot V^{-1}$, where t is the charge/discharge current, t is the discharge time, m is the mass of electrode material and V is the voltage difference. The highest capacitance values, calculated from the discharge curves, were 277 Fg$^{-1}$, and 245 Fg$^{-1}$ in 6 M KOH and 1 M H$_2$SO$_4$, respectively. Considering the surface area (554.3 m$^2$g$^{-1}$), this value can be converted to a considerably high value of 49.9 µFcm$^{-2}$ which is much higher value than 10~30 µFcm$^{-2}$ which are typically showed in carbon materials [L. L. Zhang and X. S. Zhao, *Chem. Soc. Rev.* 2009, 38:2520; J. Han et al., *ACS Nano* 2013, 7:19]. This means the BN-1H has highly electrochemical-active surface characteristics.

Example 2

Supercapacitor Fabrication

Fabrication and Properties of Two-Electrode BN—HCDN Supercapacitors

Figure 7A:
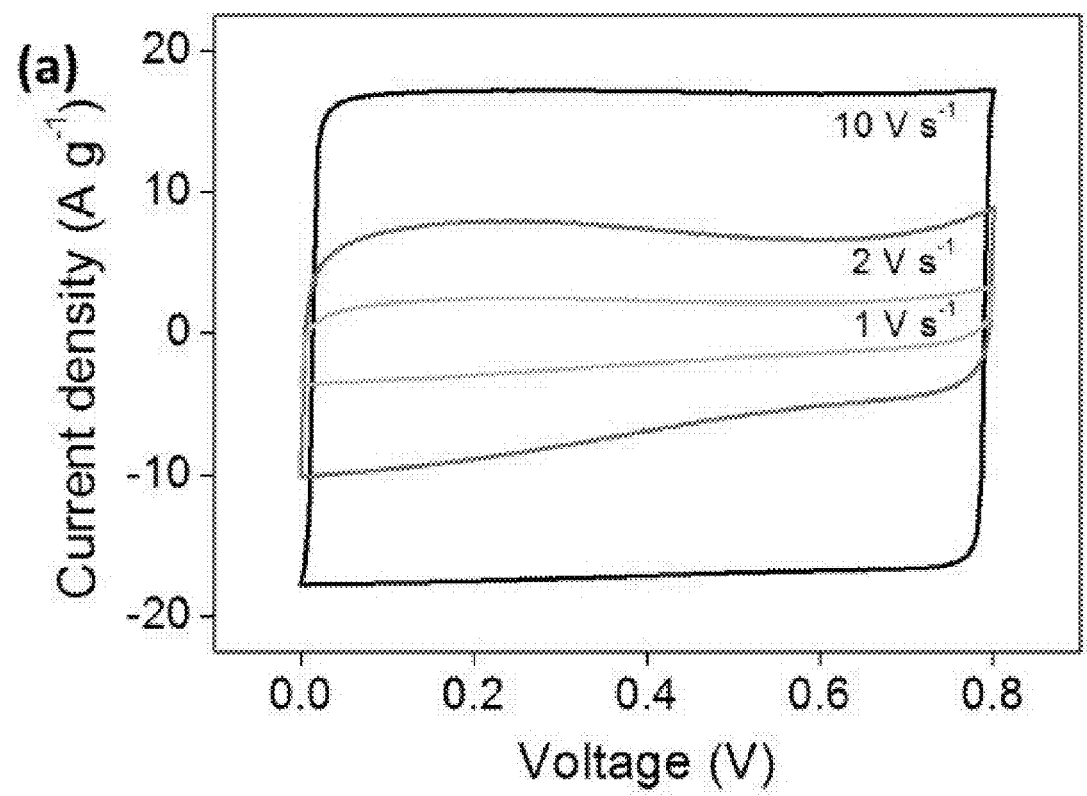
FIG. 7A depicts electrochemical characterization of thin film supercapacitor, wherein CVs profiles of a thin film supercapacitor of BN-1H in a 6 M KOH, at different scan rates, from low to high.
Figure 7B:
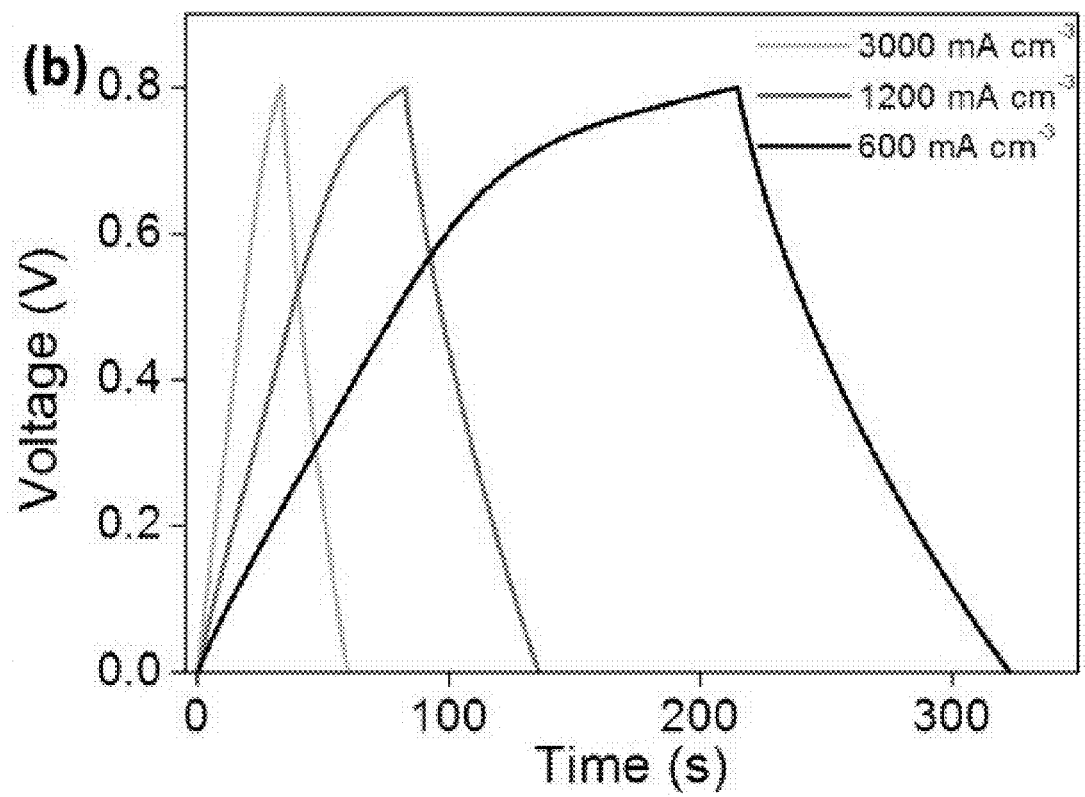
FIG. 7B depicts galvanostatic charge/discharge curves at different current densities.
Figure 7C:
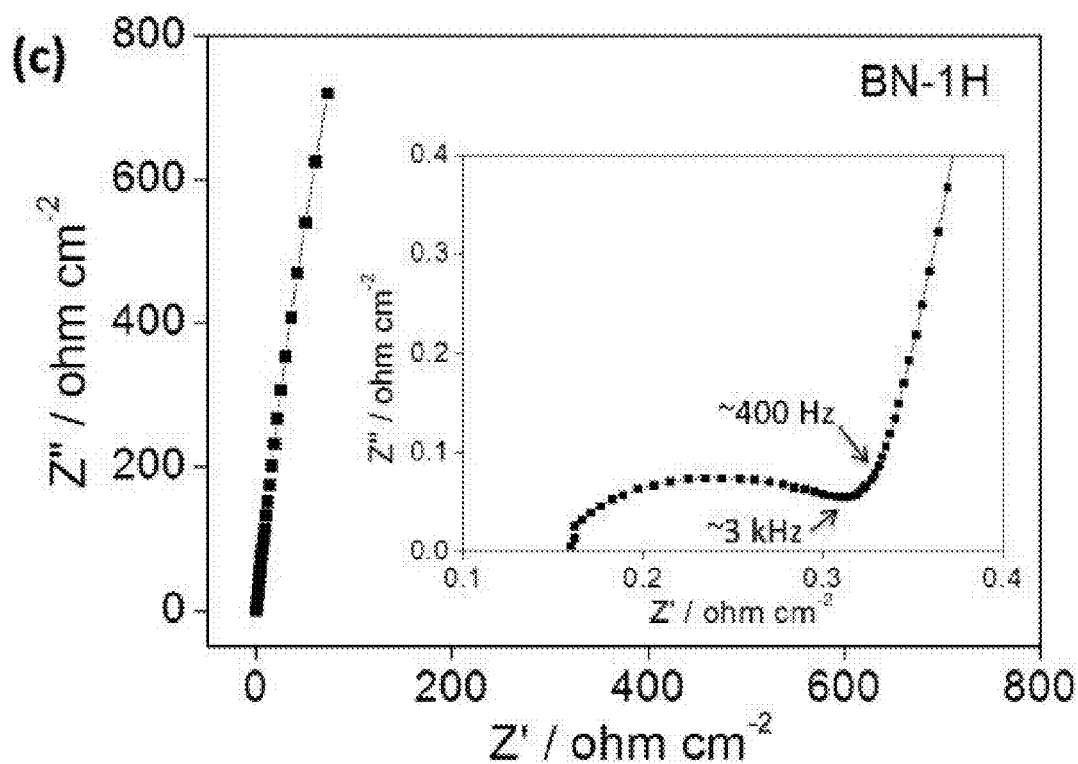
FIG. 7C depicts complex plane plot of the impedance analysis, with a magnification for the high-frequency region in the inset.

The above results demonstrate BN-1H particles have superior electro-chemical properties and thus should be used for the fabrication of the two-electrode supercapacitors. The steps taken to prepare the devices are as follows: BN-1H carbon nanoparticles processed from the arc furnace as describe above are electro-sprayed onto two identical stainless steel substrates to form thin films of BN-1H. In order to retain high efficiency (low internal resistance), no organic binding material has been used in assembly the BN-1H nanoparticles. The thin films are further compacted under a pressure of 700 MPa to a thickness of ca. 1 µm. The two densified electrodes are sandwiched together mechanically with a polypropylene separator layer between them. This assembly is then soaked in the 6 M of KOH electrolyte. FIG. 7 shows the characteristics of a typical supercapacitor. Cyclic voltammograms (CVs) were recorded at scan rates from 1,000 mV s$^{-1}$ to 10,000 mV s$^{-1}$ to test the power capability of the thin film supercapacitor (FIG. 7A). Almost perfect rectangular shaped CV curves, up to the very high scan rate, indicate low resistance, as well as its high power characteristics for the device. The galvanostatic charge/discharge curves at three current densities are shown in FIG. 7B. The specific capacitance was calculated from the discharge curves with values of 28.3, 28.1, and 28.1 F cm$^{-3}$ obtained at current densities of 600, 1200, and 3000 mA cm$^{-3}$, respectively (FIG. 7B).

Figure 7D:
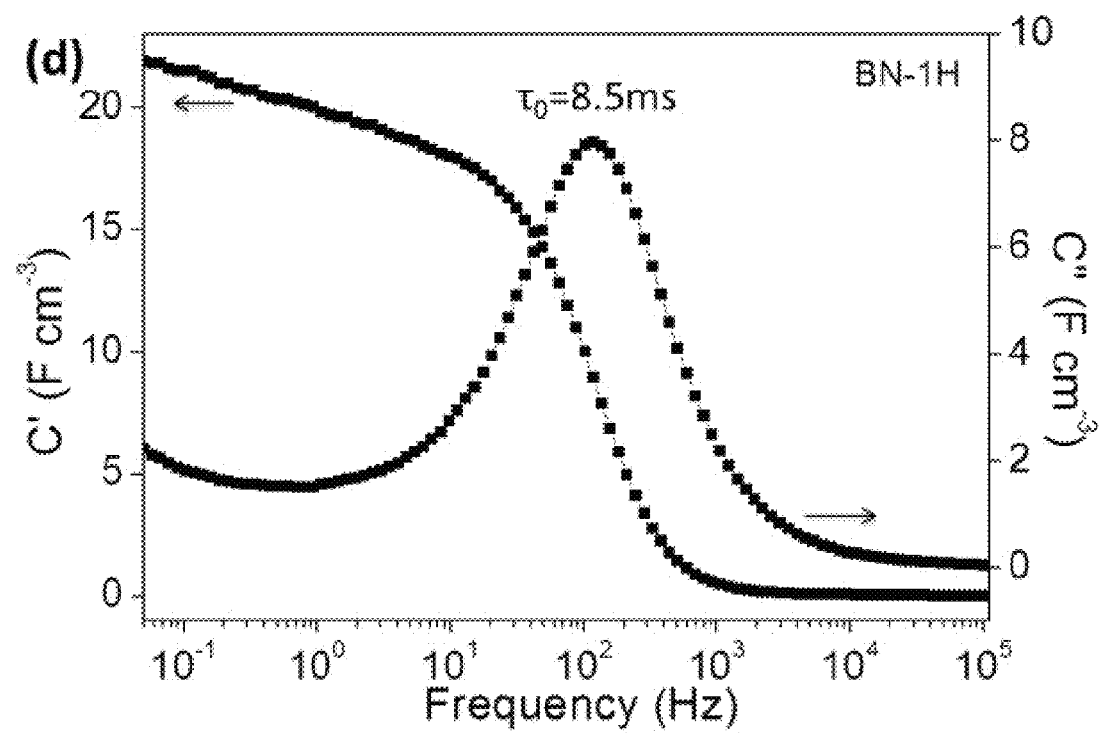
FIG. 7D depicts the real and imaginary part of the capacitance (C' and C") as a function of frequency. Very low relaxation time constant $\tau_0$ (8.5 ms) is confirmed.

Electrochemical impedance spectroscopy (EIS) further confirms the superior power performance of the compacted BN-1H thin film supercapacitor. The vertical feature in the Nyquist plot of BN-1H shows the nearly ideal capacitive behavior of the cell. The equivalent series resistance obtained from the intercept of the plot on the real axis is only 0.34 Ω cm$^{-2}$. From the expanded high-frequency range data (FIG. 7C, inset), a transition between the RC semicircle and the migration of electrolyte was observed at a frequency ca. 3000 Hz. The diffusion of electrolyte ions stopped ca. 400 Hz, and thereafter the full capacitance was reached. The thin film supercapacitor of BN-1H shows superior frequency response with a very small relaxation time constant $\tau_0$ of 8.5 ms ($\tau_0$ being the minimum time needed to discharge all the energy from the device with an efficiency of greater than 50% [P. Banerjee, I. Perez, L. Henn-Lecordier, S. B. Lee, G. W. Rubloff, *Nat. Nanotech.* 2009, 4:292]; FIG. 7D). This small time constant for BN-1H is very promising compared with previously reported values for planar micro-supercapacitors: activated carbon (700 ms) [D. Pech et al., *Nat. Nanotech.* 2010, 5:651], onion-like carbon (26 ms) [Pech (2010)] and direct laser writing graphene device (19 ms) [M. F. El-Kady and R. B. Kaner, *Nat. Commun.* 2013, 4:1475]. The measured electrical properties of the BN-1H two-electrode supercapacitor give a high power density (4.58 kW cm$^{-3}$) and energy density (2.45 mWh cm$^{-3}$). Furthermore, the thin film BN-1H supercapacitors show excellent cycling stability, retaining ca. 90% of the initial performance after 10,000 charge/discharge cycles.

Synthesis of Boron and Nitrogen Doped Arc Carbon Materials

The arc system used in this study is described in detail elsewhere [L. S. Wang et al., *Appl. Phys. A* 2007, 87:1]. Briefly, the arc consists of two electrodes. The cathode is a solid ⅜-inch diameter randomly oriented graphite (ROG)

rod. The anode is a cup-like structure fabricated from a ⅜-inch diameter ROG rod with a 3/16-inch diameter hole, 4 inch deep, in the center of the end facing the cathode. The hole, or cup, in the anode cup is filled with tightly compacted graphite powder; as a boron (B) source 10 wt % $B_4C$ was mixed with graphite powder.

After the chamber was evacuated, 300 Torr of Nitrogen (N) gas was introduced. Nitrogen was used as nitrogen source. A 100 Amp DC arc was applied to heat the graphite powder inside the hole. A potential of 27-28 V was maintained between the electrodes by adjusting the spacing between them, typically 0.5 to 0.7 inch. A typical synthesis experiment lasts ca. 7 min. The arc soot deposited on the surface of chamber was collected.

Some graphite impurities exist in the as-collected soot, so a purification process was performed to remove un-desired carbon species. First, the as-collected sample was dispersed in a solution of water and ethanol (9:1) and then sonicated to make a highly dispersed suspension. The suspension was centrifuged to remove heavy graphitic balls from the arc soot. After the centrifugation, the supernatant was freeze-dried overnight to yield the purified arc soot. This sample is designated as the as-synthesized BN—HCDN herein. For the control experiment, pure graphite powder without $B_4C$ addition was introduced into the arc discharge process to produce soot doped with only nitrogen, which is designated as the N sample.

For the synthesis of the BN-1H sample, as-synthesized carbon soot underwent a heat treatment in air at 450° C. to etch-remove of the amorphous portion of the material.

Characterization of Synthesized Materials

Scanning electron microscopic (SEM) images were obtained using a Hitachi SU8030 field emission SEM (FE-SEM). Transmission electron microscopy (TEM), selected area electron diffraction (SAED) studies were performed using a JEOL 2100F FAST TEM working at 200 kV. Structural characterization of the arc carbon was done by X-ray diffraction (XRD, D/MAX-A, Rigaku) featuring Jade Analysis software. The surface area and pore size distribution of the synthesized HCDN were measured by nitrogen adsorption/desorption isotherms, using a Micrometrics ASAP 2020 system. The sample was degassed at 398 K under vacuum overnight before analysis, to remove any adsorbed impurities. The surface area was measured using the Brunauer-Emmett-Teller (BET) model for relative pressures and the distribution of pore dimensions was calculated using the Barrett-Joyner-Halenda (BJH) model. XPS spectra were recorded on a Thermo Scientific ESCALAB 250Xi. All binding energies (BEs) are referred to the graphitic C 1s line at 284.7 eV.

Compressing Test for the BN-1Sample

The in situ TEM experiments were performed in a JEOL JEM-2010F. Images were recorded with an AMT CCD camera. The sample was diluted in ethanol, ultrasonicated and drop-casted on to a 0.25-mm Au wire that was mounted on an N force-probing holder (AFM-TEM holder) from Nanofactory Instruments AB. The sample is mounted on a piezotube which enables three-dimensional movement with sub-nanometer precision. For load measurements, this holder relies on the deflection of a silicon cantilever with a sharp tip. These experiments were carried out with a cantilever of a spring constant of 2.3 $nNm^{-1}$. Finally, the stress can be estimated by assuming a circular area of contact and measuring the diameter from the TEM micrographs.

Electrochemical Characterization of Synthesized Materials

Three-electrode test: Electrochemical measurements were performed using an AUTOLAB PGASTAT 302N potentiostat with a standard three-electrode setup in both 6 M of KOH and 1 M $H_2SO_4$. Working electrodes were prepared by drop-casting the samples on a glassy carbon electrode: A Pt plate and an Ag/AgCl electrode saturated with KCl were used as a counter electrode and reference electrode, respectively. Cyclic voltammograms were recorded within the range from 0 to -1 V in KOH and from 0 to 1 V in $H_2SO_4$ at various scan rates. Galvanostatic charge/discharge was carried out within the same voltage range of CV measurement at various current densities. Electrochemical impedance spectroscopy (EIS) measurement was carried out by applying voltage amplitude of 10 mV at OCV (open circuit voltage) in the frequency range from 100 kHz to 50 mHz.

Calculations: The capacitance of each device was calculated from the galvanostatic charge/discharge curves using the formula:

For a three electrode configuration:

$$C_{electrode} = \frac{i \times \Delta t}{\Delta V}$$

Where i (A) is the discharge current, Δt (s) is the discharge time, ΔV (V) is the voltage change (excluding the iR drop) within the discharge time. Gravimetric specific capacitance was calculated by dividing capacitance by the mass of electrode material.

For a two electrode thin film configuration:

$$C_{device} = \frac{i \times \Delta t}{\Delta V} \times 4$$

Where i (A) is the discharge current, Δt (s) is the discharge time, ΔV (V) is the voltage change (excluding the iR drop) within the discharge time, the multiplier of 4 adjusts the capacitance of the cell and the combined mass of two electrodes to the capacitance and mass of a single electrode. Specific capacitance was calculated based on the volume of the device according to the following formula:

Volumetric capacitance $(C_v) = C_{device}/V$ where V refers to the volume ($cm^3$) of the device.

The energy density ($Whcm^{-3}$) and power density ($Wcm^{-3}$) derived from the charge/discharge curves are calculated by the following equations:

$$E = C_v \times \frac{\Delta V^2}{2 \times 3600}$$

$$P = \frac{\Delta V^2}{4} \cdot R_{ESR} \cdot V$$

For the calculation of maximum power density, $R_{ESR}$ (equivalent series resistance) of the device was obtained from the EIS (Electrochemical impedance spectroscopy) measurements.

Incorporation by Reference

All of the patents, patent applications, patent application publications and other publications recited herein are hereby incorporated by reference as if set forth in their entirety.

The present invention has been described in connection with what are presently considered to be the most practical and preferred embodiments. However, the invention has been presented by way of illustration and is not intended to be limited to the disclosed embodiments. Accordingly, one The claimed invention is:

1. A method of making a carbonaceous nanoparticle, comprising:
    reacting a first carbon source with a second carbon source in the presence of a nitrogen source in a DC arc furnace to form a composite nanoparticle,
        wherein the second carbon source comprises a dopant,
        wherein the composite nanoparticle comprises a crystalline carbon phase having an amorphous phase comprising dopant or carbide; and
    removing the amorphous phase from the composite nanoparticle by heating at 450° C. in air to form the carbonaceous nanoparticle,
        wherein the carbonaceous nanoparticle comprises a nanoporous particle having a framework consisting of internested carbon nano-horns and twisted nano-graphite sheets.

2. The method of claim 1, wherein the first carbon source is selected from graphite and carbon black.

3. The method of claim 1, wherein the dopant comprises boron.

4. The method of claim 1, wherein the dopant comprises boron carbide ($B_4C$).

5. The method of claim 1, wherein the ratio of the weight percent of the first carbon source to the second carbon source comprises from about 2:1 to about 20:1.

6. The method of claim 5, wherein the ratio of the weight percent of the first carbon source to the second carbon source comprises about 9:1.

* * * * *